(12) United States Patent
Kobashi

(10) Patent No.: US 8,654,408 B2
(45) Date of Patent: Feb. 18, 2014

(54) DOCUMENT PROCESSING APPARATUS, DOCUMENT PROCESSING METHOD, AND STORAGE MEDIUM

(75) Inventor: Kazufumi Kobashi, Tokyo (JP)

(73) Assignee: Canon Kabushiki Kaisha (JP)

( * ) Notice: Subject to any disclaimer, the term of this patent is extended or adjusted under 35 U.S.C. 154(b) by 816 days.

(21) Appl. No.: 12/430,309

(22) Filed: Apr. 27, 2009

(65) Prior Publication Data

US 2009/0273804 A1    Nov. 5, 2009

(30) Foreign Application Priority Data

May 1, 2008    (JP) ................................ 2008-119986

(51) Int. Cl.
*G06F 3/12*    (2006.01)
*G06K 15/02*    (2006.01)
*H04N 1/387*    (2006.01)

(52) U.S. Cl.
USPC ........... 358/448; 358/451; 358/452; 358/453; 358/462; 358/538; 358/1.18; 382/293; 382/295

(58) Field of Classification Search
USPC .......... 358/1.11–1.18, 1.1, 2.1, 1.9, 400–404, 358/448, 453; 715/251, 255, 269, 274, 273, 715/277; 399/382, 82; 382/293–298, 276
See application file for complete search history.

(56) References Cited

U.S. PATENT DOCUMENTS

| | | | | |
|---|---|---|---|---|
| 5,337,161 A | * | 8/1994 | Hube | 358/448 |
| 5,848,320 A | * | 12/1998 | Yaginuma et al. | 399/45 |
| 6,828,990 B2 | * | 12/2004 | Krolczyk et al. | 715/777 |
| 7,097,369 B2 | * | 8/2006 | Barry et al. | 400/62 |
| 2003/0070146 A1 | * | 4/2003 | Sato et al. | 715/525 |
| 2003/0156851 A1 | * | 8/2003 | Koh et al. | 399/45 |
| 2008/0046835 A1 | * | 2/2008 | Nguyen et al. | 715/777 |
| 2008/0219690 A1 | * | 9/2008 | Ono | 399/82 |

FOREIGN PATENT DOCUMENTS

| | | |
|---|---|---|
| JP | 10-282585 A | 10/1998 |
| JP | 2003037704 A | 2/2003 |
| JP | 2004-058508 A | 2/2004 |
| JP | 2005014251 A | 1/2005 |

OTHER PUBLICATIONS

Insert and Delete a worksheet, applies to Microsoft Excel 2007, Office.com, http://office.microsoft.com/en-us/excel-help/insert-or-delete-a-worksheet-HP001217034.aspx#BMinsertsheet.*
JP Office Action issued Jun. 18, 2012 for corresponding JP2008-119986.
Japanese Office Action issued in Japanese counterpart application No. JP2008-119986, dated Aug. 31, 2012.

* cited by examiner

*Primary Examiner* — Chad Dickerson
(74) *Attorney, Agent, or Firm* — Rossi, Kimms & McDowell LLP

(57) ABSTRACT

An object is to reduce operation load on a user when correcting the positional shift of tab document data with respect to a tab sheet. This invention provides a document processing method of a document processing apparatus, which includes acquiring tab sheet information to be used for printing, determining, based on the acquired tab sheet information and document data containing tab print data to be printed on the tab portion of a tab sheet, whether the tab print data is allocated on the tab portion of the tab sheet, and if it is determined that the tab print data is not allocated on the tab portion of the tab sheet, shifting the tab print data, based on the acquired tab sheet information and the document data containing the tab print data, so as to be allocated on the tab portion of the tab sheet.

12 Claims, 36 Drawing Sheets

FIG. 4A

| NO | ATTRIBUTE INFORMATION | | REMARKS |
|---|---|---|---|
| 1 | PRINTING METHOD | SINGLE-SIDED / DOUBLE-SIDED / BOOKLET PRINTING | |
| 2 | SHEET SIZE | DOCUMENT SIZE / FIXED SIZE | • DESIGNATE Z-FOLDING FOR "A4+A3", "B4+B3", AND "LETTER+LEDGER (11×17)"<br>• AUTOMATICALLY SELECT DOCUMENT SIZE OF FIRST CHAPTER / FIRST PAGE FOR BOOKLET PRINTING OR N-up PRINTING |
| 3 | SHEET ORIENTATION | PORTRAIT / LANDSCAPE | • SELECTABLE ONLY FOR FIXED SIZE |
| 4 | BINDING MARGIN / BINDING DIRECTION | | • ALLOW TO DESIGNATE SHIFT / SCALING |
| 5 | N-up PRINTING | NUMBER OF PAGES / ALLOCATION ORDER / BOUNDARY LINE / ALLOCATION POSITION, ETC. | • NINE ALLOCATION POSITION PATTERNS<br>• ALLOW TO DESIGNATE EQUAL-MAGNIFICATION PRINTING |
| 6 | SCALING | ON / OFF | AUTOMATICALLY SET ON FOR FIXED SHEET SIZE OR N-up PRINTING; ALLOW OFF DESIGNATION |
| 7 | WATERMARK | | • ALLOW INDEPENDENT DESIGNATION FOR RESPECTIVE LOGICAL PAGES AND RESPECTIVE PHYSICAL PAGES<br>• FOR ALL CHAPTERS / ALL PAGES |

FIG. 4B

| | | |
|---|---|---|
| 8 | HEADER / FOOTER | • ALLOW INDEPENDENT DESIGNATION FOR RESPECTIVE LOGICAL PAGES AND RESPECTIVE PHYSICAL PAGES<br>• FOR ALL CHAPTERS / ALL PAGES |
| 9 | DISCHARGE METHOD | STAPLING / PUNCH HOLE | • ALLOW STAPLING / PUNCHING ONLY FOR SINGLE-SIDED / DOUBLE-SIDED PRINTING<br>• ONE OR TWO STAPLING POSITIONS AVAILABLE |
| 10 | BOOKBINDING DETAILS | OPENING DIRECTION / SADDLE STITCHING / SCALING DESIGNATION / BINDING MARGIN / SEPARATE BINDING DESIGNATION, ETC. | • ONLY IN BOOKLET PRINTING |
| 11 | FRONT COVER / BACK COVER | | • PRINTING DESIGNATION FOR FRONT COVER 1 / 2 AND BACK COVER 1 / 2<br>• PAPER FEED PORT (INCLUDING INSERTER) DESIGNATION |
| 12 | INDEX SHEET | | • ALLOW TO SET CHARACTER STRING PRINTING ON INDEX PORTION AND ANNOTATION ON INDEX SHEET<br>• NOT ALLOW DESIGNATION FOR BOOKLET PRINTING |
| 13 | INTERLEAF | | • PAPER FEED PORT (INCLUDING INSERTER) DESIGNATION<br>• ALLOW TO PRINT DOCUMENT DATA ON INSERTED SHEET<br>• NOT ALLOW DESIGNATION FOR BOOKLET PRINTING |
| 14 | CHAPTER SEGMENTATION | "NONE" / "CHANGE FOR PAGE" / "CHANGE FOR SHEET" | • FIX "CHANGE FOR SHEET" FOR INDEX SHEET OR INTERLEAF<br>• "CHANGE FOR SHEET" FOR SINGLE-SIDED PRINTING |

FIG. 5

| NO | ATTRIBUTE INFORMATION | | REMARKS |
|---|---|---|---|
| 1 | SHEET SIZE | DOCUMENT SIZE / FIXED SIZE | • AUTOMATICALLY DESIGNATE "CHANGE FOR SHEET" FOR FIXED SIZE<br>• CHANGEABLE ONLY FOR DESIGNATED PAPER IF A PLURALITY OF KINDS OF PAPER ARE SELECTED FOR BOOK; SHEET SIZE IS CHANGEABLE EVEN FOR DESIGNATION COMPLYING WITH BOOK |
| 2 | SHEET ORIENTATION | PORTRAIT / LANDSCAPE | • SELECTABLE ONLY FOR FIXED SIZE |
| 3 | N-up PRINTING DESIGNATION | NUMBER OF PAGES / ALLOCATION ORDER / BOUNDARY LINE / ALLOCATION POSITION, ETC. | • NINE ALLOCATION POSITION PATTERNS |
| | SCALING | ON / OFF | • ALLOW TO DESIGNATE EQUAL-MAGNIFICATION PRINTING |
| 4 | | | • AUTOMATICALLY SET ON FOR FIXED SHEET SIZE OR N-up PRINTING; ALLOW OFF DESIGNATION |
| 5 | WATERMARK | DISPLAY ON / OFF | • DESIGNATE WHETHER TO DISPLAY ALL WATERMARKS DESIGNATED IN BOOK |
| 6 | HEADER / FOOTER | DISPLAY ON / OFF | • DESIGNATE WHETHER TO DISPLAY ALL HEADERS / FOOTERS DESIGNATED IN BOOK |
| 7 | DISCHARGE METHOD | STAPLING | • OFF IS SELECTABLE WHEN STAPLING IS DESIGNATED FOR BOOK; DEFAULT IS ON |

FIG. 6

| NO | ATTRIBUTE INFORMATION | | REMARKS |
|---|---|---|---|
| 1 | TAB DOCUMENT | | DESIGNATE TAB DOCUMENT OR NOT |
| 2 | PAGE ROTATION DESIGNATION | | ALLOW TO DESIGNATE 0° / 90° / 180° / 270° |
| 3 | WARTERMARK | DISPLAY ON / OFF | DESIGNATE WHETHER TO DISPLAY ALL WATERMARKS DESIGNATED IN BOOK |
| 4 | HEADER / FOOTER | DISPLAY ON / OFF | DESIGNATE WHETHER TO DISPLAY ALL HEADERS / FOOTERS DESIGNATED IN BOOK |
| 5 | ZOOM | 50%–200% | DESIGNATE RELATIVE SCALING RATIO TO HAVE SIZE FITTED IN VIRTUAL LOGICAL PAGE REGION AS 100% |
| 6 | ALLOCATION POSITION | | DESIGNATE NINE FIXED PATTERNS OR ARBITRARY POSITION |
| 7 | ANNOTATION | | |
| 8 | VARIABLE ITEM | | |
| 9 | PAGE DIVISION | | |

F I G. 18

| No | ATTRIBUTE INFORMATION | REMARKS |
|---|---|---|
| 1 | TAB PRINT CONTENT | OBJECT INFORMATION OF TAB PRINT CONTENT IN ELECTRONIC DOCUMENT DATA |
| 2 | TAB POSITION | POSITION OF PROTRUDING TAB OF TAB PRINT CONTENT |
| 3 | REVERSE-SIDE TAB INFORMATION | DESIGNATE WHETHER TAB DOCUMENT DATA IS REVERSE-SIDE TAB DOCUMENT DATA |

DOCUMENT PROCESSING APPARATUS, DOCUMENT PROCESSING METHOD, AND STORAGE MEDIUM

BACKGROUND OF THE INVENTION

1. Field of the Invention

The present invention relates to a document processing technique of processing a document file for bookbinding.

2. Description of the Related Art

Digital multifunctional peripherals are recently gaining more complex functions and can now implement bookbinding methods such as case binding that are conventionally specialties of commercial printing. A paper insertion function even enables printing including front cover, interleaf, tab sheet, and z-folding.

POD (Print On Demand) using a digital multifunctional peripheral is also becoming popular, and document reception using electronic document files is increasing recently.

Against this backdrop, various programs for efficiently inputting print instructions to a digital multifunctional peripheral have been developed.

More specifically, application programs for systematically performing page operations in an electronic document file, print format setting, and document input to a digital multifunctional peripheral have been developed. A printer driver used to input a print instruction from a document creation application program such as Microsoft Office or Acrobat of Adobe Systems to a digital multifunctional peripheral is designed to be able to set a print format.

Some electronic document files created by such a variety of programs contain data to be printed on the protruding tabs of tab sheets. Techniques of causing an application program or a printer driver to print data on the protruding tabs of tab sheets are also proposed (e.g., Japanese Patent Laid-Open No. 2005-014251).

In the above-described conventional technique, however, when an electronic document file containing data to be printed on the protruding tabs of tab sheets is received, it is difficult to output the data in an optimum form after page operations and print format setting.

A detailed example will be described. FIG. 33 is a view showing an example of an electronic document file containing in advance data to be printed on the protruding tabs of tab sheets. An electronic document file (to be referred to as tab document data hereinafter) 3301 contains data to be printed on the protruding tabs of tab sheets. Data 3302 is printed on a protruding tab. An electronic document file 3303 is not a file for a tab sheet. As a characteristic feature of the tab document data, its size is larger by the tab width (3304).

FIG. 34 is a view showing a state in which the electronic document file shown in FIG. 33 is read out by an application program. Reference numeral 3401 denotes a main window of the application program. A menu tool bar 3402 is used to use the functions of the application program. An icon 3403 represents a print format set state.

A tree view 3404 represents a page (book, chapters, and pages) configuration in the application program. A region 3405 displays a page preview in the application program.

Reference numeral 3406 represents a preview of a page complying with the print format in the application program. Page 1 previews tab document data printed on a tab sheet. This also applies to pages 4 and 7.

When the second chapter (pages 4 to 6) is deleted in this state, the pages of the third chapter move to the position of the second chapter. At this time, the tab document data of page 7 is printed on the tab sheet of the second chapter, and the tab print position shifts from the protruding tab created in advance.

FIG. 35 is a view showing a state in which the second chapter in FIG. 34 is deleted. A page tree view 3501 represents a page configuration after deletion of the second chapter. Reference numeral 3502 represents a preview of the tab document data of the third chapter printed on the tab sheet of the second chapter. The tab document data of the third chapter is created such that it is printed on the third protruding tab. On the tab sheet of the second tab, the data which should be printed on the protruding tab cannot be printed.

That is, when an electronic document file containing in advance data to be printed on protruding tabs is received, and page operations are then performed via an application program, data to be printed on protruding tabs cannot be printed. In this case, the data to be printed on protruding tabs needs to be created again using a document creation application program, resulting in a decrease in the operation efficiency.

SUMMARY OF THE INVENTION

The present invention has been made in consideration of the above-described problem.

A document processing apparatus according to the present invention has the following arrangement.

That is, a document processing apparatus comprising: an acquisition unit configured to acquire tab sheet information about a tab sheet to be used for printing; a determination unit configured to determine, based on the tab sheet information acquired by the acquisition unit and document data containing tab print data to be printed on a tab portion of the tab sheet, whether the tab print data is allocated on the tab portion of the tab sheet; and a shift unit configured to, if the determination unit has determined that the tab print data is not allocated on the tab portion of the tab sheet, shift the tab print data, based on the tab sheet information acquired by the acquisition unit and the document data containing the tab print data, so as to be allocated on the tab portion of the tab sheet.

According to the present invention, it is possible to reduce operation load on a user when correcting the positional shift between a protruding tab and data to be printed on it in an electronic document file.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are views showing a list of book attributes;

FIG. 5 is a view showing a list of chapter attributes;

FIG. 6 is a view showing a list of page attributes;

FIG. 18 is a view showing an example of tab print content information;

DESCRIPTION OF THE EMBODIMENTS

Embodiments of the present invention will now be described in detail with reference to the accompanying drawings.

[First Embodiment]

<1. Explanation of Document Processing System>

An outline of a document processing system according to the present invention will be described below with reference to FIGS. 1 to 12. This document processing system includes an electronic document writer which converts application data created by a general application into an electronic document file, and a bookbinding application which edits the electronic document file and provides a book file. The bookbinding application can edit a book file that bundles created electronic document files. In this embodiment, operation load on a user is reduced by improving the operability.

<1.1 Functional Arrangement and Operation of Document Processing System>

Figure 1:
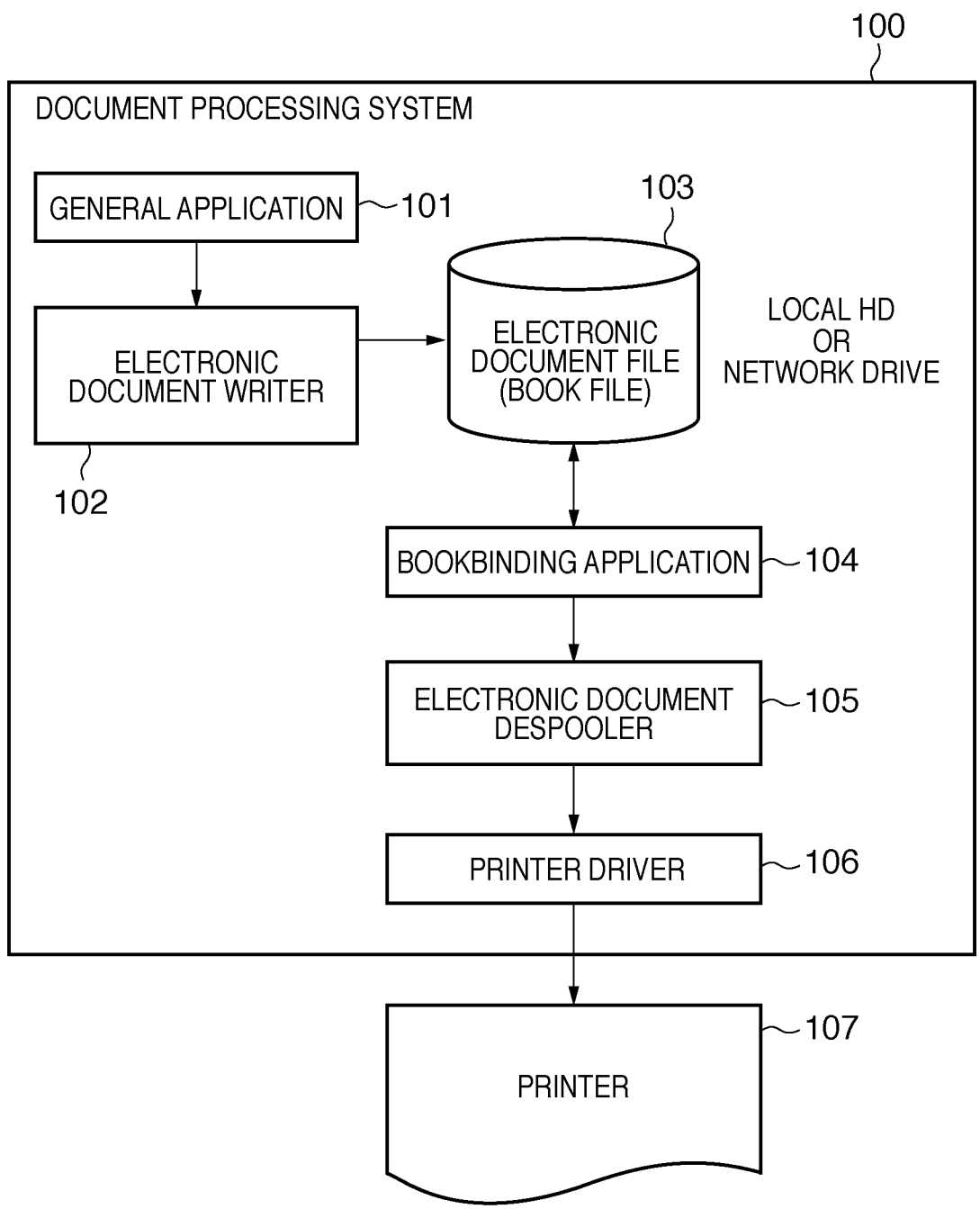
FIG. 1 is a block diagram showing the functional arrangement of a document processing system.

FIG. 1 is a block diagram showing the functional arrangement of a document processing system 100 (also called a document processing apparatus) according to the embodiment. A general application 101 shown in FIG. 1 is an application program which provides functions such as word processing, spreadsheet, photo retouch, draw or paint, presentation, and text edit. The general application 101 has a print function for an OS (Operating System).

These applications use a predetermined interface (generally called a GDI) which is provided by the OS when printing application data such as created document data or image data.

More specifically, to print created application data, the general application 101 transmits a predetermined output command (called a GDI function) with an OS-dependent format to the output module of the OS that provides the above-described interface.

Upon receiving the output command, the output module converts it into a format processable by an output device such as a printer, and outputs the converted command (called a DDI function).

Since the format processable by an output device changes depending on the device type, maker, model, and the like, each device provides a device driver. The OS converts the command, generates print data, and encloses it in a JL (Job Language) using the device driver, thereby generating a print job. When Microsoft Windows is used as the OS, a module called GDI (Graphic Device Interface) corresponds to the above-described output module.

An electronic document writer 102 is a software module provided to implement the document processing system by improving the above-described device driver. However, the electronic document writer 102 does not aim at a specific output device, and converts an output command into a format processable by a bookbinding application 104 or a printer driver 106 (both will be described later).

The format (to be referred to as an "electronic document format" hereinafter) after conversion by the electronic document writer 102 is not particularly limited as far as it can express the document of each page using a detailed format. Of practical standard formats, for example, a PDF format of Adobe Systems or an SVG format can be adopted as the electronic document format.

To use the electronic document writer 102, the general application 101 designates the electronic document writer 102 as a device driver to be used for output and then executes printing. However, an electronic document file created by the electronic document writer 102 does not have a perfect format as an electronic document file. For this reason, the bookbinding application 104 designates the electronic document writer 102 as a device driver. Application data is converted into an electronic document file under the control of the bookbinding application 104. The bookbinding application 104 completes a new, imperfect electronic document file generated by the electronic document writer 102 as an electronic document file having a format to be described later.

If it is necessary to clearly distinguish between a file created by the electronic document writer 102 and a bookbinding electronic document file whose structure is given by the bookbinding application 104, the former will be referred to as an "electronic document file", whereas the latter will be referred to as a "book file". If they need not be especially distinguished from each other, all application data, electronic document files, and book files generated by the general application 101 will be referred to as document files (or document data).

The electronic document writer 102 is designed as a device driver, and the general application 101 is caused to print application data, thereby converting the application data into an electronic document format. The application data is converted into an electronic document format including pages (to be referred to as "logical pages" or "document pages" hereinafter) defined by the general application 101 as a unit. The application data is then stored in a storage medium such as a hard disk as an electronic document file 103.

Note that the hard disk may be a local drive of a computer which implements the document processing system of this embodiment. It may be a network drive provided on a network when the system is connected to the network.

The bookbinding application 104 provides, to the user, functions to read out the electronic document file (or book file) 103 and edit it. However, the bookbinding application 104 provides no function of editing the contents of each page but a function of editing the structure of a book or a chapter (to be described later) including pages as minimum units.

When printing the book file 103 edited by the bookbinding application 104, the bookbinding application 104 activates an electronic document despooler 105.

The electronic document despooler 105 is a program module installed in the computer together with the bookbinding application. The electronic document despooler 105 is used to output rendering data to a printer driver when printing a book file edited by the bookbinding application.

The electronic document despooler 105 reads out a designated book file from the hard disk, generates an output command suitable for the above-described output module of the OS so as to print the pages in a format described in the book file, and outputs the command to the output module (not shown).

At this time, the printer driver 106 for a printer 107 to be used as an output device is designated as a device driver. The above-described output module converts the received output command into a device command, and outputs it to the printer driver 106 for the designated printer 107. The printer driver 106 converts the command into a command in, for example, a page description language interpretable by the printer 107. The printer driver 106 transmits the converted command to the printer 107 via a system spooler (not shown). The printer 107 prints an image corresponding to the command.

<1.2 Hardware Configuration of Document Processing System>

Figure 2:
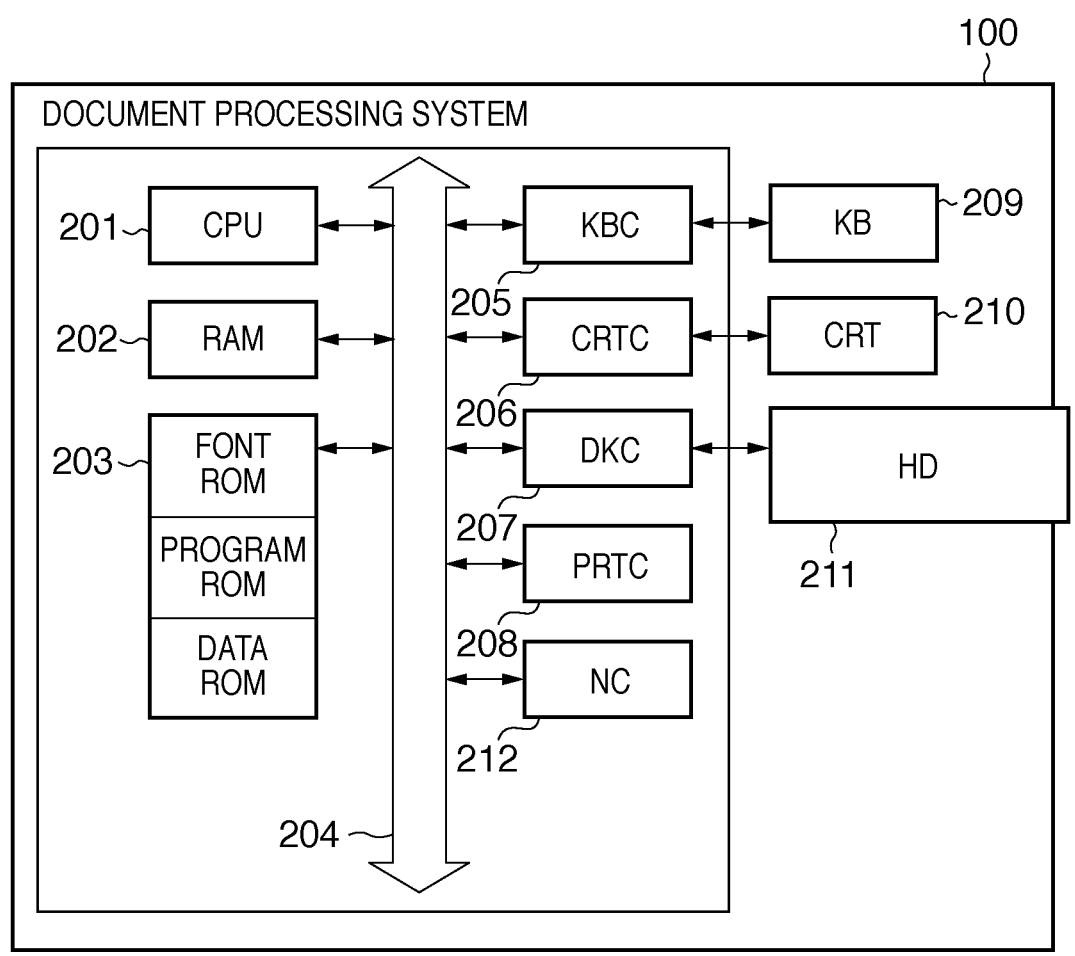
FIG. 2 is a block diagram showing the hardware configuration of the document processing system.

FIG. 2 is a block diagram showing the hardware configuration of the document processing system 100 (also called a document processing apparatus). Referring to FIG. 2, a CPU 201 executes the OS and programs such as the general application and the bookbinding application stored in the program ROM of a ROM 203 or loaded from a hard disk 211 to a RAM 202.

The functions shown in FIG. 1 are implemented in accordance with the procedures of flowcharts to be described later. The RAM 202 functions as the main memory or work area of the CPU 201. A keyboard controller (KBC) 205 controls key inputs from a keyboard 209 or a pointing device (not shown). A CRT controller (CRTC) 206 controls display on a CRT display 210.

A disk controller (DKC) 207 controls access to, for example, the hard disk 211 or a Floppy® disk which stores boot programs, various applications, font data, user files, and book files to be described later. A PRTC 208 controls signal exchange with the connected printer 107. An NC 212 is connected to the network and controls communication with other devices connected to the network.

<1.3 Data Format of Book File>

The data format of a book file will be described before an explanation of details of the bookbinding application 104. A book file has a three-layered structure which simulates a book of paper media. The upper layer is called "book", which simulates one book and defines attributes associated with the whole book.

The intermediate layer below the upper layer corresponds to chapters in a book, and is also called "chapter". It defines the attributes of each chapter. The lower layer is "page" corresponding to respective pages defined by the application program. It defines the attributes of each page. One book may include a plurality of chapters, and one chapter may include a plurality of pages.

Figure 3:
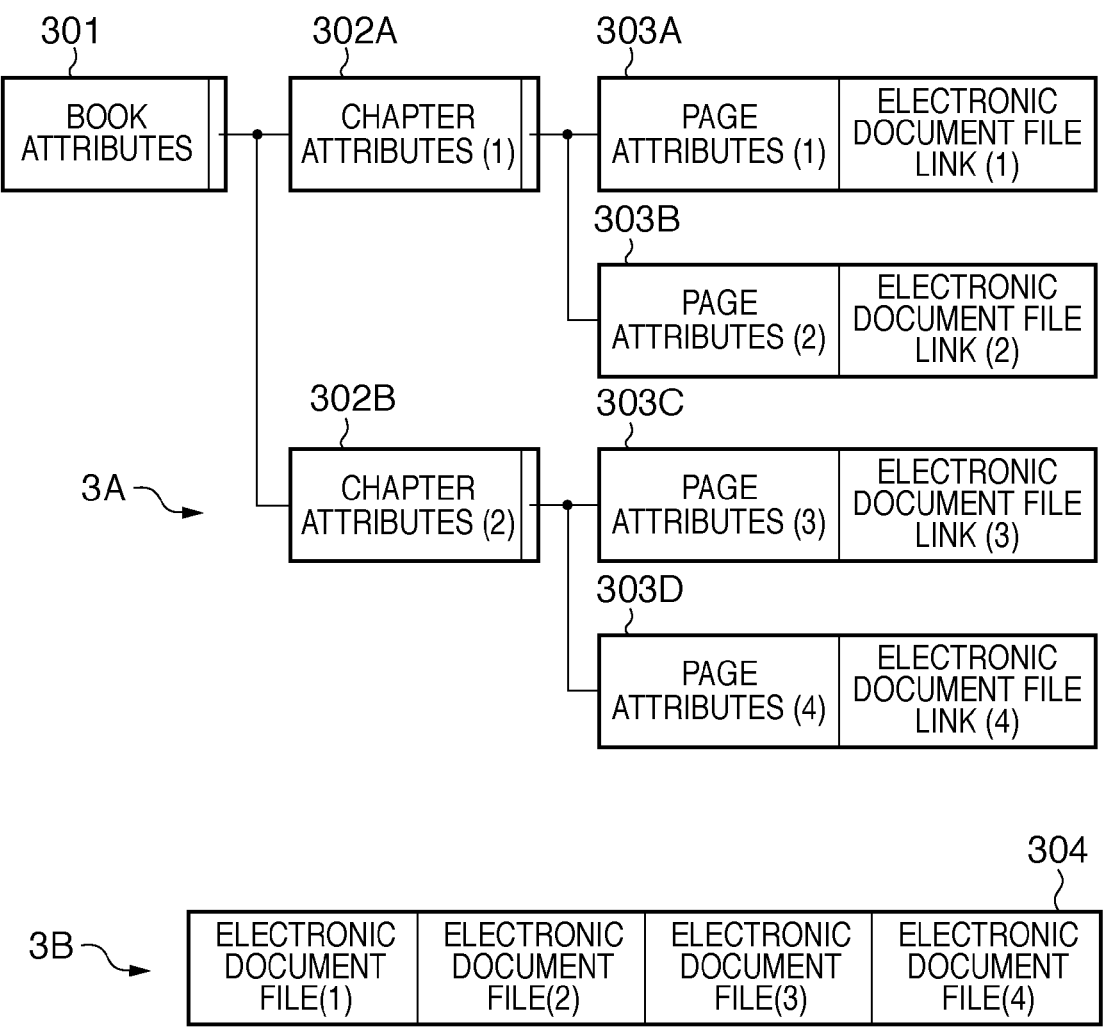
FIG. 3 is a view showing examples of a book file structure.

Reference number 3A in FIG. 3 is a view schematically showing an example of a book file format. As shown in reference number 3A in FIG. 3, a book, chapters, and pages in the book file of this example are respectively indicated by corresponding nodes. One book file includes one book.

The book and chapters include defined attribute values and links (associations) to lower layers as their entities because they are concepts to define the structure (attribute information associated with bookbinding) as a book. Each page has, as its entity, a corresponding electronic document file generated by the general application 101 and converted by the electronic document writer 102. Hence, each page includes the entity (electronic document file) of a document page and a link (association) to the electronic document file.

Note that a print page to be output to a paper medium sometimes includes a plurality of document pages. This structure is not indicated by links but is indicated by attributes in the book, chapter, and page layers.

Referring to reference number 3A in FIG. 3, a book node 301 defines book attributes and is linked to two chapter nodes 302A and 302B. These links indicate that the book node 301 includes the chapter nodes 302A and 302B.

The chapter node 302A defines chapter attributes and is linked to page nodes 303A and 303B, which indicates that the chapter node 302A includes the pages. The page nodes 303A and 303B define page attributes and include links to electronic document files (1) and (2) as their entities, respectively. These links indicate electronic document files (1) and (2) represented by 304 in reference number 3B in FIG. 3, and show that the entities of the page nodes 303A and 303B are the electronic document files (1) and (2).

FIGS. 4A and 4B are views showing a list of book attributes. For items that overlap those of lower layers, attribute values of lower layers are preferentially adopted. For this reason, as for items included in only the book attributes, the values defined in the book attributes are effective values throughout the book. However, as for items which overlap those of lower layers, these values indicate prescribed values if they are not defined in lower layers. Note that each item shown in FIGS. 4A and 4B does not always correspond to one item in practice, but may sometimes include a plurality of associated items.

FIG. 5 is a view showing a list of chapter attributes. FIG. 6 is a view showing a list of page attributes. The relationship between the chapter attributes and the page attributes is the same as that between the book attributes and the attributes of a lower layer.

As is apparent from FIGS. 4A to 6, six items are unique to the book attributes: printing method, bookbinding details, front/back cover, index sheet (tab sheet), interleaf, and chapter segmentation. These items are defined throughout a book. As printing method attributes, three values, that is, single-sided printing, double-sided printing, and booklet printing can be designated. Booklet printing is a printing method that enables bookbinding by bundling a separately designated number of paper sheets, folding them into folio, and binding them. When booklet printing is designated, the direction of double-page spreading, the number of paper sheets to be bundled, and the like can be designated as the bookbinding details attribute.

The front/back cover attribute includes a designation of addition of paper sheets serving as front and back covers, and a designation of print contents for the added paper sheets when printing electronic document files included in a book. The index sheet attribute includes a designation of insertion of a separately prepared tabbed index sheet to the printer, and a designation of print contents to be printed on the index (tab) portion. However, for a tab sheet to print tab document data to be described later, the print contents to the index portion are not reflected. This attribute is valid when the printer to be used includes an inserter having an insertion function of inserting a paper sheet prepared independently of printing paper sheets to a desired position, or when a plurality of paper feed cassettes are usable. This also applies to the interleaf attribute.

The interleaf attribute includes a designation of insertion of paper sheets to be supplied from an inserter or a paper cassette as chapter segmentations, and a designation of a paper source when inserting interleaves.

The chapter segmentation attribute includes a designation of use of a new paper sheet, use of a new print page, or do-nothing at chapter segmentations. In single-sided printing, use of a new paper sheet and use of a new print page have the same significance. In double-sided printing, if "use of new paper sheet" is designated, successive chapters are never printed on one paper sheet. However, if "use of new print page" is designated, successive chapters may be printed on the obverse and reverse sides of one sheet.

As for the chapter attributes, there are no items unique to chapters, and all items overlap those of the book attributes. Hence, if definitions in the chapter attributes are different from those in the book attributes, values defined in the chapter attributes are used preferentially. Five items are common to the book attributes and only the chapter attributes: sheet size, sheet orientation, N-up printing designation, scaling, and discharge method.

Of these items, the N-up printing designation attribute is an item to designate the number of document pages to be included in one print page. Allocations that can be designated are 1×1, 1×2, 2×2, 3×3, 4×4, and the like. The discharge method attribute is an item to designate whether to staple discharged paper sheets. The validity of this attribute depends on whether the printer to be used has a staple function.

Items unique to the page attributes include a tab document attribute, page rotation attribute, zoom, allocation designation, annotation, and page division. The tab document attribute is an item to designate whether a linked electronic document file is tab document data. The page rotation attribute is an item to designate a rotation angle when allocating a document page on a print page.

The zoom attribute is an item to designate the scaling ratio of document pages. The scaling ratio is designated to have the size of a virtual logical page region as 100%. The virtual logical page region is a region occupied by one document page when document pages are allocated in accordance with, for example, an N-up designation. For, for example, 1×1, the virtual logical page region corresponds to one print page. For 1×2, the virtual logical page region is obtained by reducing each side of a print page to about 70%.

Attributes common to the book, chapter, and page attributes are a watermark attribute and a header/footer attribute. A watermark is an image or a character string separately designated to be superimposed on an electronic document file.

A header and footer are watermarks printed on the top and bottom margins of each page. Note that as the header and footer, items such as a page number and a date/time that can be designated as variables are prepared.

Note that the contents that can be designated in the watermark and header/footer attributes are common in the chapter and page attributes but are different in the book attributes. In the book attributes, the contents of a watermark and header/footer can be set. How to print a watermark and header/footer throughout the book can also be designated. On the other hand, in the chapter and page attributes, whether or not to print, in a chapter and page, the watermark and header/footer designated in the book attributes can be designated.

<1.4 Book File Generation Procedure>

A book file has the above-described structure and contents. A procedure of causing the bookbinding application 104 and the electronic document writer 102 to create a book file will be described next. The book file creation procedure is implemented as part of a book file edit operation of the bookbinding application 104.

Figure 7:
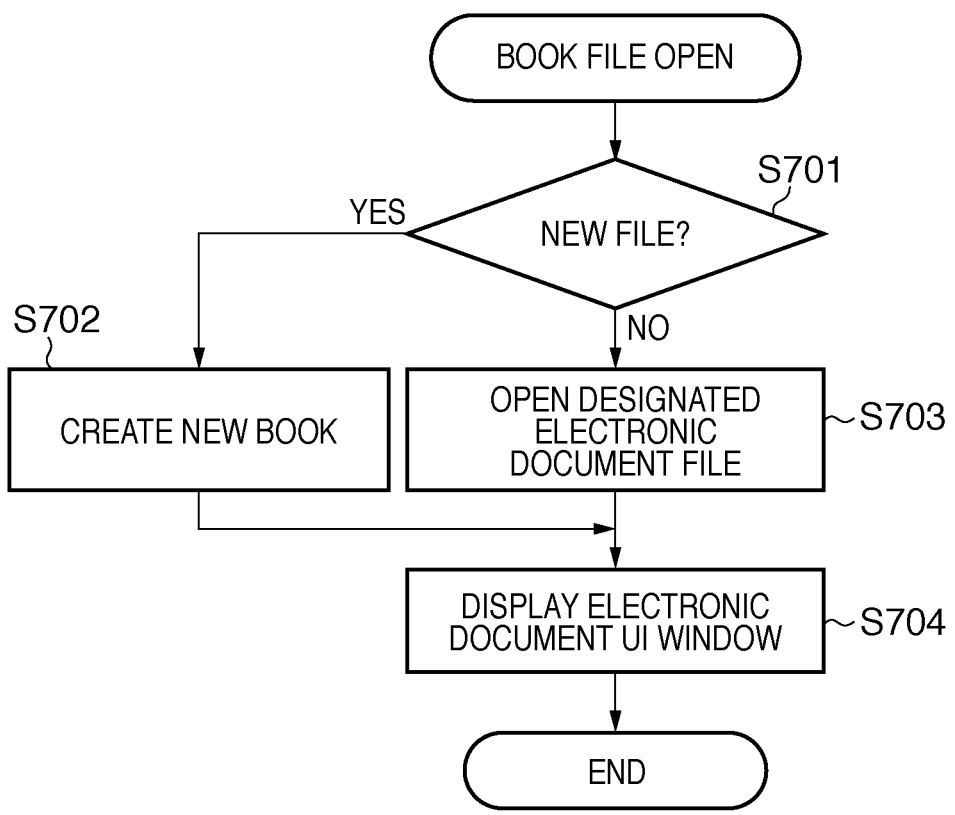
FIG. 7 is a flowchart illustrating an example of a procedure of opening a book file.

FIG. 7 illustrates a procedure of causing the bookbinding application 104 to open a book file. The bookbinding application 104 first determines whether a book file to be opened is an existing book file or a file to be newly created (step S701). When creating a new file, the bookbinding application 104 creates a new file including no chapters (step S702).

The newly created file has only the book node 301 in the example of reference number 3A in FIG. 3. The book node has no links to chapters. As book attributes, those prepared in advance for a newly created file are applied.

Figure 10:
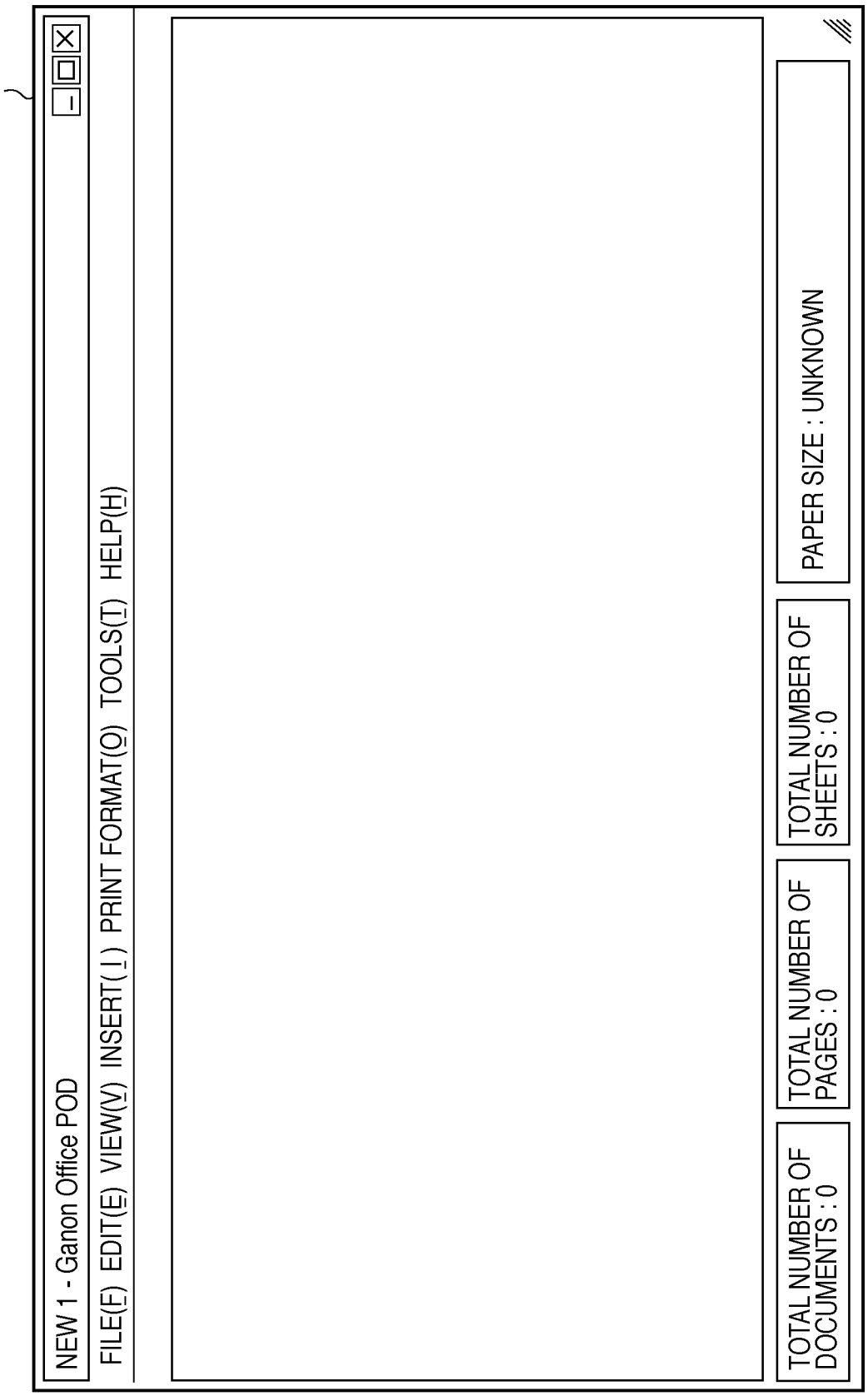
FIG. 10 is a view showing a UI window of a bookbinding application.

Then, a user interface (UI) window to edit the new book file is displayed (step S704). FIG. 10 shows an example of a UI window displayed when a new book file has been created. In this case, the book file has no actual contents, and a UI window 1000 displays nothing.

If an existing book file is present, the bookbinding application 104 opens the designated book file (step S703), and displays a UI window in accordance with the structure, attributes, and contents of the book file.

Figure 11:
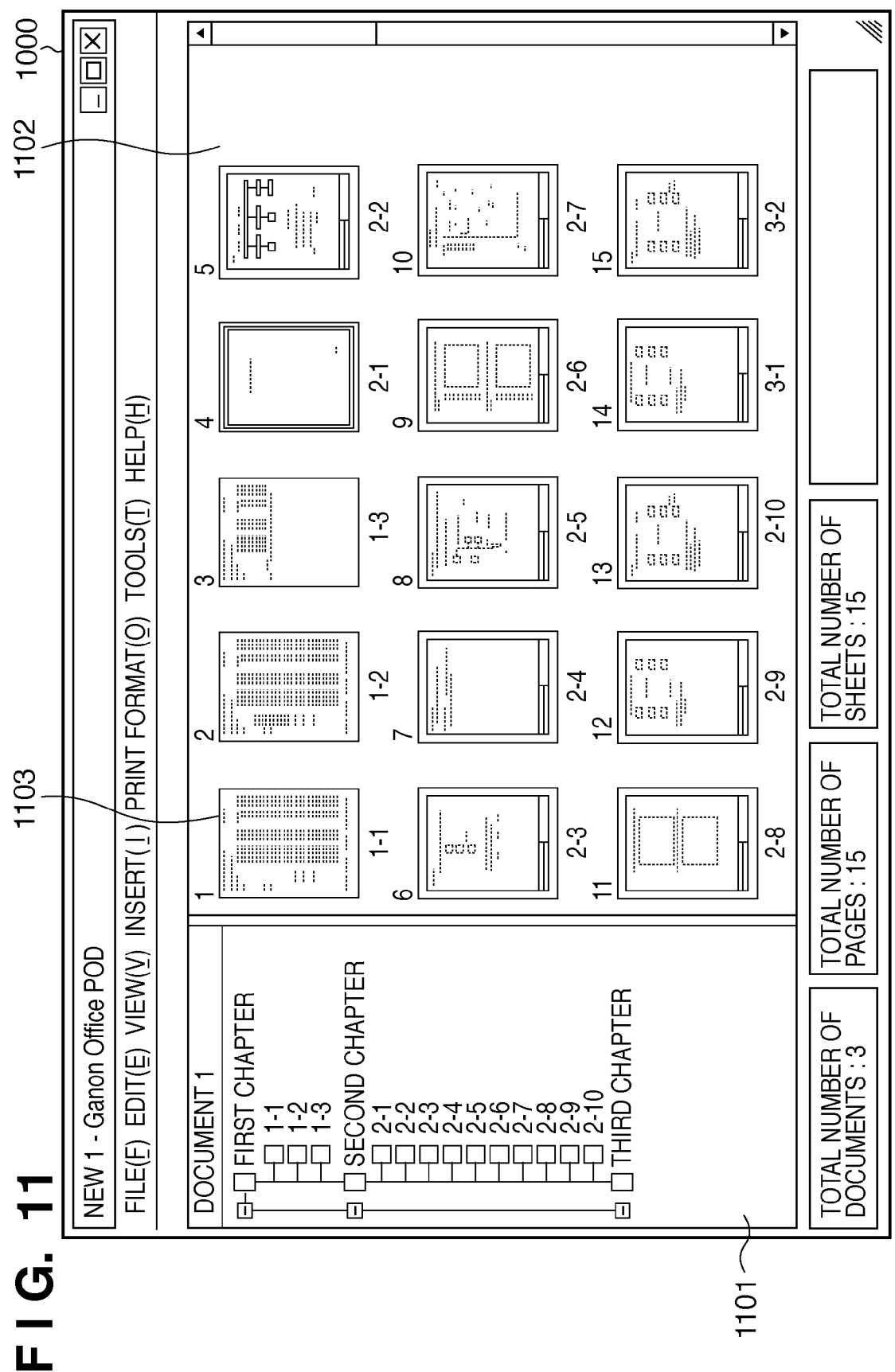
FIG. 11 is a view showing a UI window of a bookbinding application.

FIG. 11 shows an example of a UI window to display a designated one of existing book files. The UI window 1000 includes a tree portion 1101 representing the structure of the book, and a preview portion 1102 that displays a printed state. The tree portion 1101 displays chapters included in the book, and pages included in each chapter using a tree structure as shown in reference number 3A in FIG. 3.

The pages displayed in the tree portion 1101 are document pages. The preview portion 1102 displays the contents of print pages in a reduced scale. The display order reflects the book structure.

Application data converted by the electronic document writer 102 into an electronic document file can be added to the opened book file as a new chapter. This function is called an electronic document import function.

When an electronic document is imported to the book file newly created in accordance with the procedure shown in FIG. 7, an entity is given to the book file. This function is activated by drag-and-drop of application data to the window shown in FIG. 11.

Figure 8:
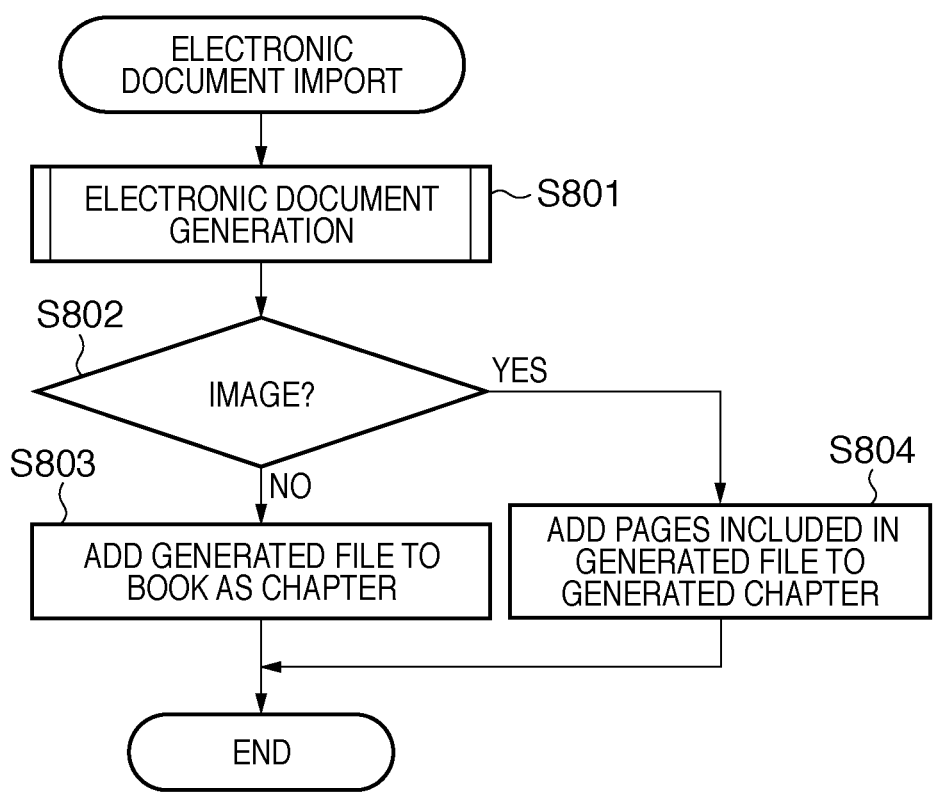
FIG. 8 is a flowchart illustrating an example of a procedure of importing an electronic document file to a book file.

FIG. 8 illustrates a procedure of electronic document import. The general application 101 that has generated designated application data is activated. While designating the electronic document writer 102 as a device driver, the general application 101 prints and outputs the application data, thereby converting it into an electronic document file (step S801).

When conversion has ended, it is determined whether the converted application data is image data (step S802). Under the Windows, this determination is done based on the file extension of the application data.

If the extension is, for example, "bmp", the data is Windows bitmap data. If the extension is "jpg", the data is JPEG-compressed image data. If the extension is "tiff", the data is image data in the tiff format.

Such image data can directly generate an electronic document file without activating the general application 101 in step S801. Hence, the process in step S801 can be omitted.

If the application data is not image data, the electronic document file generated in step S801 is added to the book of the currently opened book file as a new chapter (step S803). Of the chapter attributes, items common to the book attributes have values copied from the book attributes. For the remaining items, prescribed values prepared in advance are set.

If it is determined in step S802 that the application data is image data, document pages included in the electronic document file generated in step S801 are added to a designated chapter in principle, instead of adding a new chapter (step S804). If the book file is a newly created file, a new chapter is created, and the pages of the electronic document file are added as pages belonging to the chapter.

Of the page attributes, items common to an upper layer have the same attribute values as in the upper layer. Items whose attribute values should be inherited from the application data to the electronic document file are given those values. For example, if the application data has an N-up designation, the page attributes inherit the attribute value. In this way, a new book file is created, or a new chapter is added.

Figure 9:
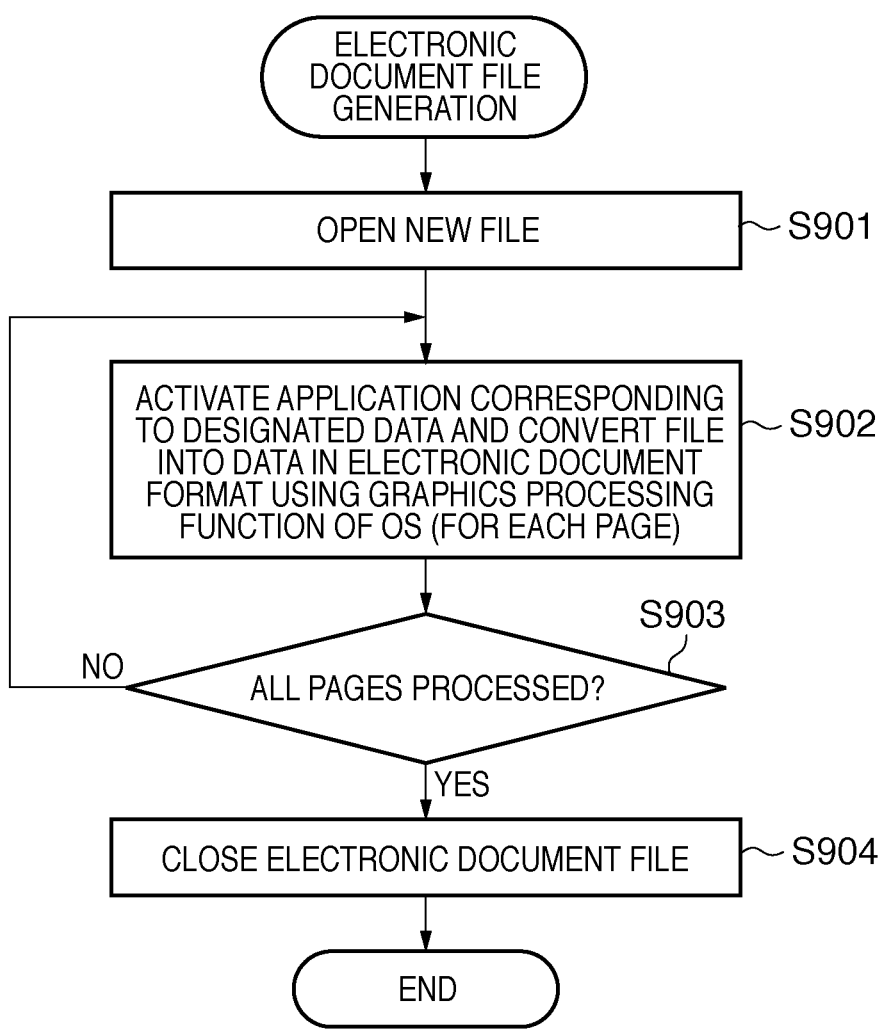
FIG. 9 is a flowchart illustrating an example of a procedure of converting application data into an electronic document file.

FIG. 9 is a flowchart illustrating a procedure of causing the electronic document writer 102 to generate an electronic document file in step S801 of FIG. 8. First, the electronic document writer 102 creates a new electronic document file and opens it (step S901).

A general application corresponding to the designated application data is activated to output an output command to the output module of the OS while designating the electronic document writer as a device driver. The output module causes the electronic document writer 102 to convert the received output command into data in an electronic document format, and outputs it (step S902).

The output destination is the electronic document file opened in step S901. It is determined whether all designated application data have been converted (step S903). If the conversion has ended, the electronic document file is closed (step S904). The electronic document file generated by the electronic document writer 102 is that shown in reference number 3B in FIG. 3.

<1.5 Book File Edit Procedure>

It is possible to thus create a book file from application data. The chapters and pages of the generated book file can undergo the following edit operations.

(1) New addition
(2) Delete
(3) Copy
(4) Cut
(5) Paste
(6) Move
(7) change chapter name
(8) Re-assign page number name
(9) Insert cover
(10) Insert Interleaf
(11) Insert index sheet
(12) Page layout for each document page An operation of canceling an edit operation that was made once, and an operation of redoing the canceled operation are also possible. These edit functions allow edit operations such as integration of a plurality of book files, re-allocation of chapters and pages in a book file, deletion of chapters and pages in a book file, layout change of document pages, and insertion of interleaves and index sheets.

The results of these operations are reflected on the attributes shown in FIGS. 4A, 4B and 5 or the structure of the book file. For example, when an operation of newly adding a blank page is performed, the blank page is inserted to a designation portion. The blank page is handled as a document page. When the layout of document pages is changed, the change contents are reflected on the attributes such as the printing method, N-up printing, front/back cover, index sheet, interleaf, and chapter segmentation.

<1.6 Output of Book File>

The end goal of the thus created and edited book file is print output. When the user selects a file menu in the UI window 1000 of the bookbinding application shown in FIG. 10, and then selects "print", the bookbinding application 104 creates a job ticket from the currently opened book file, and transmits it to the electronic document despooler 105.

The electronic document despooler 105 converts the job ticket into an output command of the OS, for example, a GDI function of Windows, and transmits it to the output module, for example, GDI. The output module causes the designated printer driver 106 to generate a command suitable for the device, and transmits the command to the device.

The job ticket is data which has a structure including a document page as a minimum unit. The structure in the job ticket defines the layout of document pages on a paper sheet. One job ticket is issued in correspondence with one job. The uppermost node is named "document", which defines the attributes of the whole book such as double-sided printing/single-sided printing.

Paper nodes belong to the document node, which include attributes such as the identifiers of paper sheets to be used, and a designation of a paper feed port in a printer. To each paper node, a node of a sheet to be printed using the paper sheet belongs. One sheet corresponds to one paper sheet. A print page (physical page) belongs to each sheet. In single-sided printing, one physical page belongs to one sheet. In double-sided printing, two physical pages belong to one sheet. To each physical page, document pages to be allocated on that physical page belong. The attributes of physical pages include the layout of the document pages.

The electronic document despooler 105 converts the above-described job ticket into an output command to the output module.

<1.7 Contents of Preview Display>

When the bookbinding application opens a book file, the UI window 1000 shown in FIG. 11 is displayed, as already described above. The tree portion 1101 displays a tree representing the structure of the opened book (to be referred to as a "book of interest" hereinafter). The preview portion prepares three display methods in accordance with user designations.

The first mode is called a document view that directly displays document pages. In the document view mode, the contents of document pages belonging to the book of interest are displayed in a reduced scale. The layout is not reflected on the display in the preview portion 1102.

The second is a print view mode. In the print view mode, the preview portion 1102 displays document pages while reflecting their layout. The third is a simple print view mode. In the simple print view mode, not the contents of document pages but only their layout is reflected on the display in the preview portion 1102.

<2. Arrangement of Another Document Processing System>

An outline of the document processing system 100 according to this embodiment has been described above. The document processing system 100 is of a standalone type. Even a server-client system formed by extending it can create and edit a book file using almost the same arrangement and procedure. In this case, a server manages book files and print processing.

Figure 12:
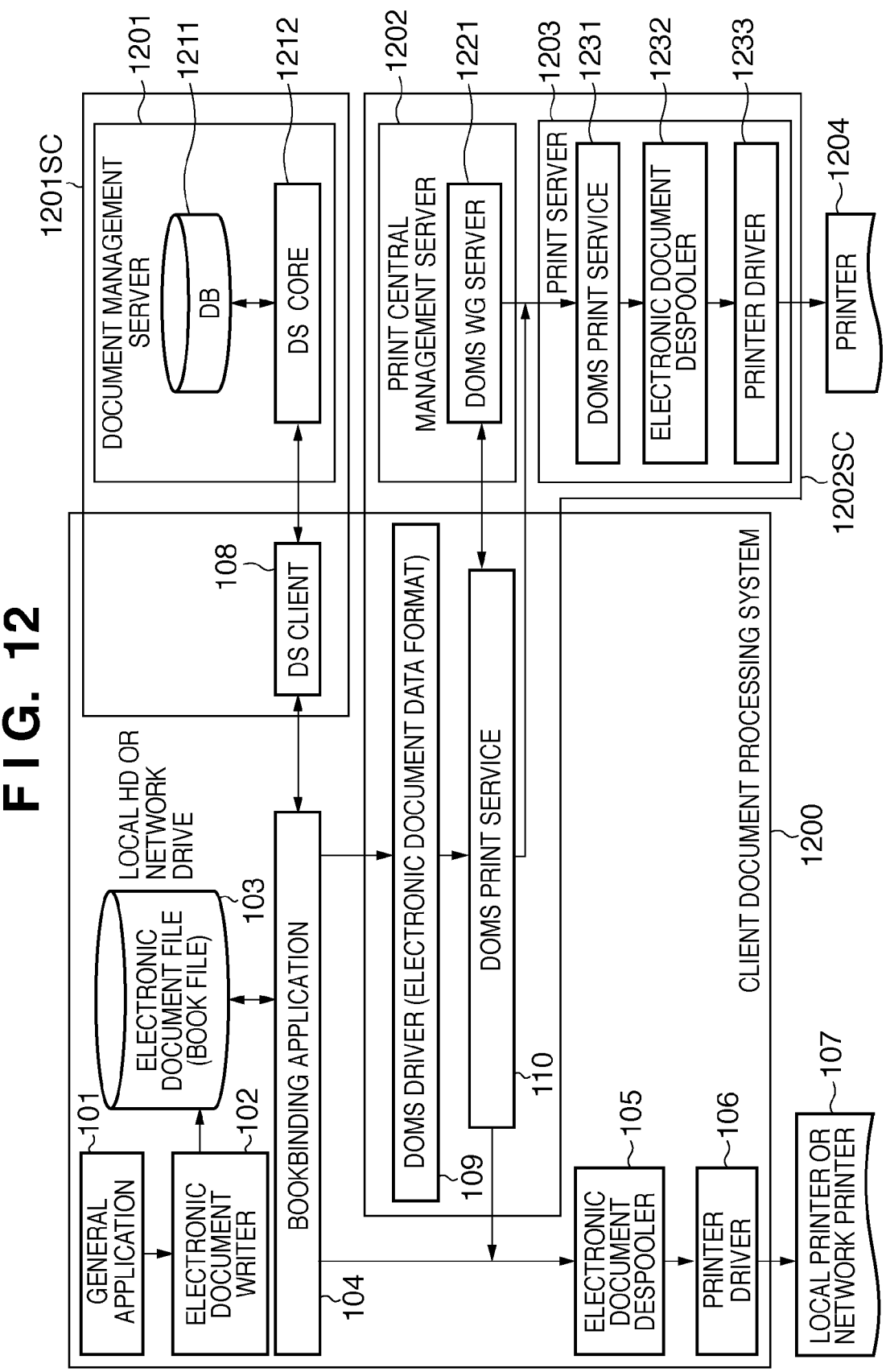
FIG. 12 is a block diagram showing the functional arrangement of a client-server type document processing system.

FIG. 12 is a block diagram showing the functional arrangement of a client-server type document processing system. The client document processing system is formed by adding, to the standalone type system, a DOMS (Document Output Management Service) driver 109, DOMS print service module 110, and DS (Document Service) client module 108 which are client modules.

The DOMS indicates a document output management service. A document management server 1201, print central management server 1202, and print server 1203 are connected to a client document processing system 1200. These servers are normally connected to the client document processing system 1200 via a network. If the servers also function as clients, they are connected by interprocess communication that simulates communication between networks.

In the example shown in FIG. 12, both the document management server 1201 and the print central management server 1202 are connected to the client document processing system 1200. However, only one of them may exist on the network. For example, if the document management server is connected as a server, a document management server-client system 1201SC including the DS client module 108 is added to the standalone type document processing system.

If the print central management server 1202 is connected as a server, a print management server-client system 1202SC including the DS client module is added to the standalone type document processing system.

The document management server 1201 stores book files created and edited by the bookbinding application 104. When the document management server 1201 manages book files, they are stored in a database 1211 of the document management server 1201 in place of or in addition to the local HD of the client document processing system 1200. Book file storage and readout between the bookbinding application 104 and the document management server 1201 are done via the DS client module 108 and a DS core 1212.

The print central management server 1202 manages printing of the book files stored in the client document processing system 1200 or the document management server 1201. A print request from the client document processing system 1200 is transmitted to a DOMS WG server module 1221 in the print central management server 1202 via the DOMS driver 109 and the DOMS print service module 110.

When the printer 107 is to perform printing, the print central management server 1202 transfers an electronic document file to the electronic document despooler 105 via the DOMS print service module 110 of the client document processing system 1200. When the print server 1203 is to perform printing, the print central management server 1202 transmits an electronic document file to a DOMS print service module 1231 of the print server 1203. The print central management server 1202, for example, performs a security check on the authenticity of a user who has issued a print request of a stored book file, or stores a log of print processing.

As described above, the document processing system can be implemented either as a standalone system or as a client-server system.

<3. Arrangement of Printer>

The arrangement of the printer 107 will be described next. The printer 107 can be a single device, a system including a plurality of devices, or a system which is connected via a network such as a LAN or WAN to execute processing as far as it can implement the functions of the present invention.

Figure 13:
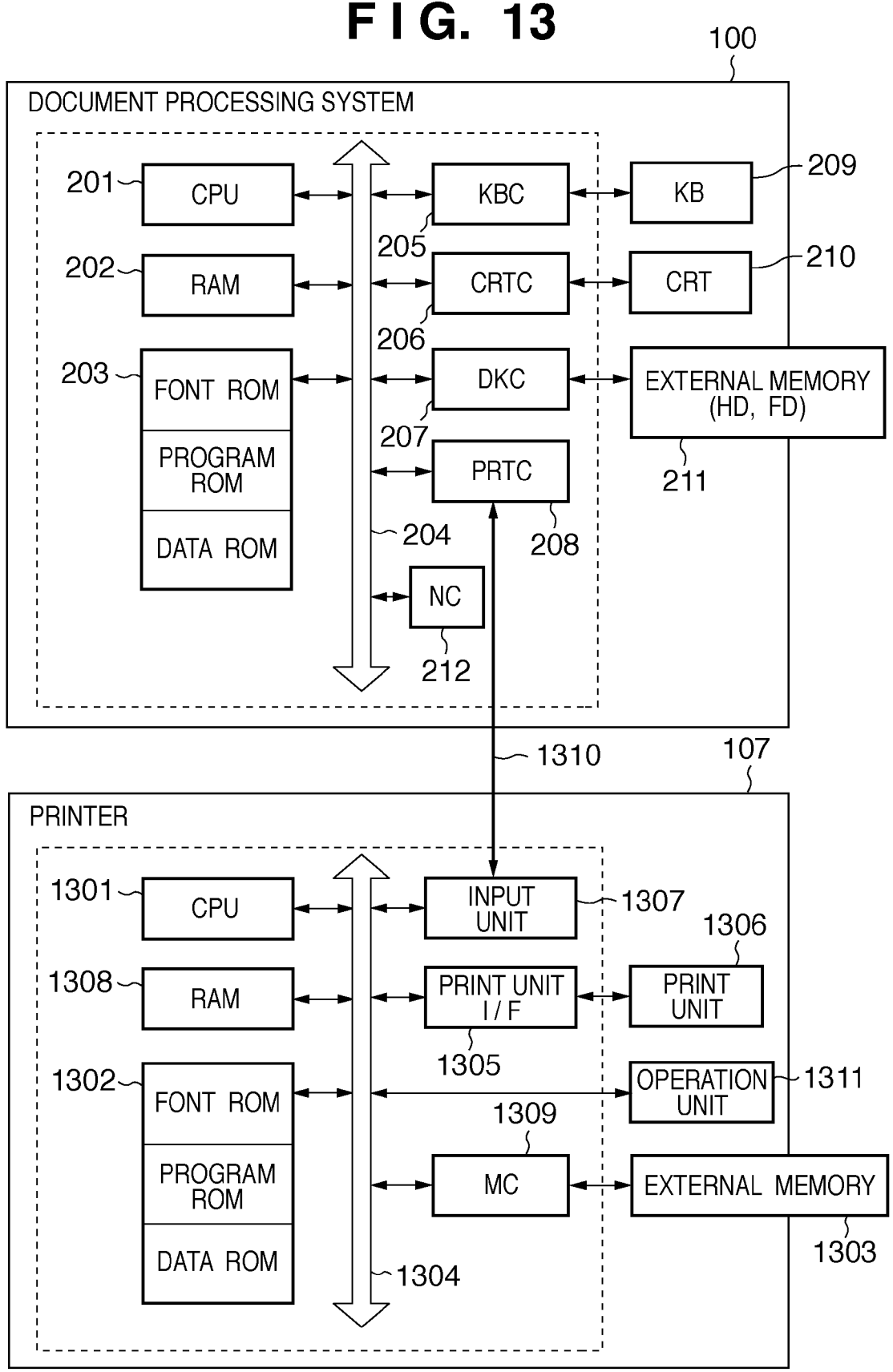
FIG. 13 is a block diagram showing the functional arrangement of a printer.

The printer 107 shown in FIG. 13 includes a CPU 1301. The CPU operates based on a control program stored in a program ROM of a ROM 1302 or a control program stored in an external memory 1303. The CPU outputs an image signal as output information to a print unit (printer engine) 1306 via a print unit I/F 1305 connected to a system bus 1304.

The program ROM in the ROM 1302 stores, for example, the control program of the CPU 1301. The font ROM in the ROM 1302 stores, for example, font data to be used when generating output information. The data ROM in the ROM 1302 stores, for example, information to be used on the document processing system 100 if the printer includes no external memory 1303 such as a hard disk.

The CPU 1301 can communicate with the document processing system 100 via an input unit 1307 and notify the document processing system 100 of, for example, information in the printer 107. A RAM 1308 is designed to function as the main memory or work area of the CPU 1301 and to be able to extend the memory capacity using an optional RAM connected to an add-on port (not shown).

Note that the RAM 1308 serves as, for example, an output information rasterization area, environment data storage area, or NVRAM. A memory controller (MC) 1309 controls access to the above-described external memory 1303 such as a hard disk (HD) or IC card. The external memory 1303 is optionally connected to store font data, emulation programs, form data, and the like. An operation unit 1311 includes switches for operations and LED indicators.

Not the above-described single external memory 1303 but a plurality of external memories may be provided. Each external memory may include an optional card in addition to built-in fonts, and store a program to interpret a printer control language of a different language system. The printer may include an NVRAM (not shown) and store printer mode setting information from the operation unit 1311.

<4. Tab Print Optimization Processing>

Tab print optimization processing that is a characteristic feature of the document processing system according to this embodiment will be described next.

<4.1 Tab Print Optimization Processing at Time of Electronic Document File Reception>

Figure 14:
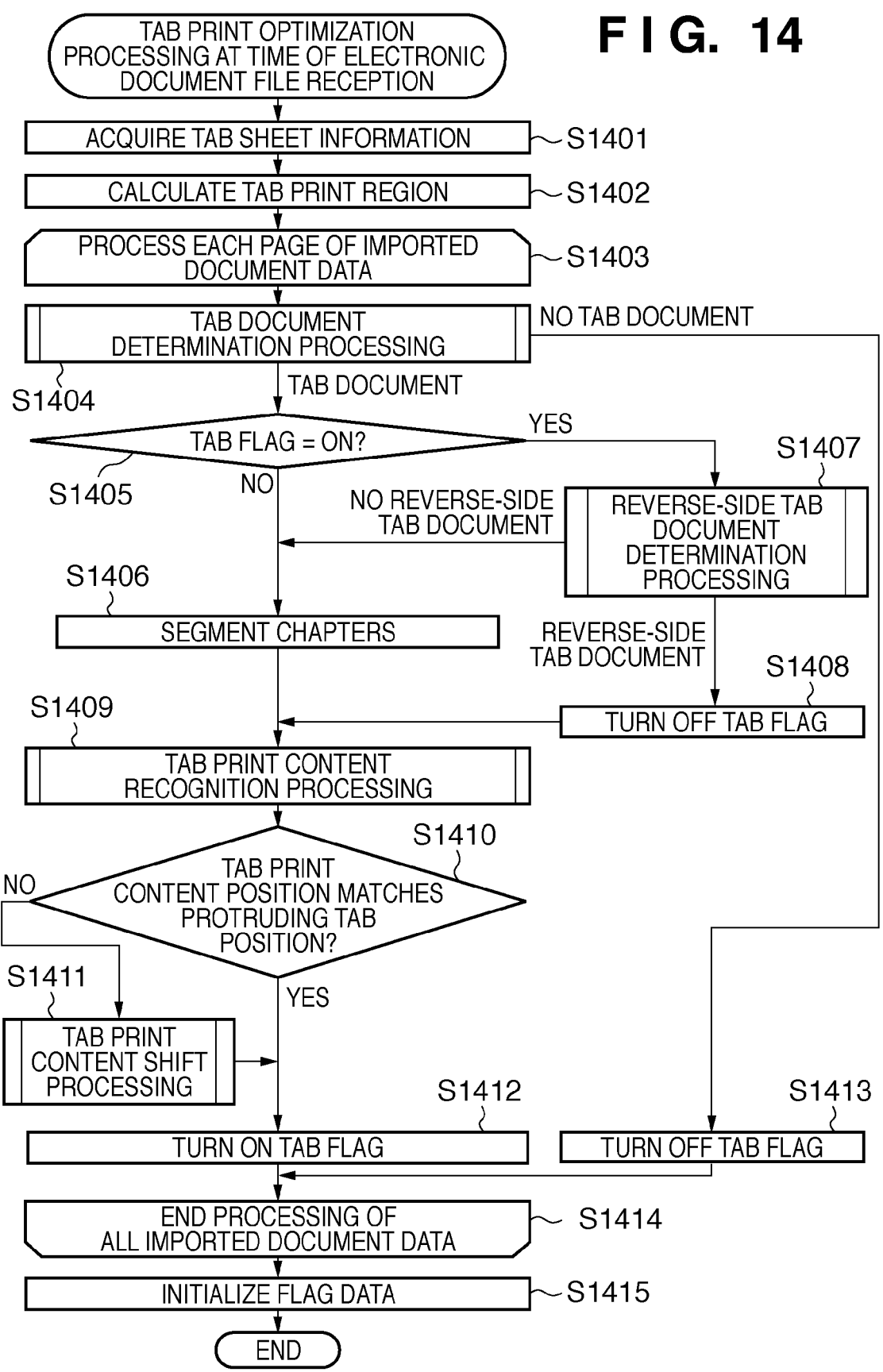
FIG. 14 is a flowchart illustrating the sequence of tab print optimization processing to be executed when the document processing system has received an electronic document file containing tab document data.

FIG. 14 is a flowchart illustrating the sequence of tab print optimization processing to be executed when the document processing system according to the embodiment has received an electronic document file (document data) containing tab document data. The process steps will be described. In this embodiment, tab document data to be received is assumed to be accurately created based on the number of protruding tabs. A case in which the original electronic document file is invalid is not taken into consideration. Note that a tab portion (e.g., 2005 in FIG. 20) of a tab sheet will be expressed as a protruding tab in the present invention.

Index sheets are inserted at chapter segmentations. This process sequence is executed every time one electronic document file is received. An electronic document file may be prepared by converting application data created by a document creation application such as Microsoft Office or Acrobat of Adobe Systems. Alternatively, an electronic document file may be obtained by converting data created by scanning a paper document using, for example, a scanner.

In step S1401, the document processing system acquires tab sheet information about a tab sheet to be printed. Note that tab sheet information includes at least a tab sheet size, the number of protruding tabs, and the width and height of a protruding tab. The tab sheet information may also include, for example, the thickness of a tab sheet. The tab sheet information may be designated by the user or acquired from a device. The process in step S1401 is implemented by causing the document processing system to read out the tab sheet information from a memory that stores it.

The document processing system may acquire the information of the printer 107 and then automatically acquire tab sheet information based on tab sheets set in the paper feed port or the inserter of the printer 107.

In step S1402, the document processing system calculates a tab print region. Based on the tab sheet information acquired in step S1401, the document processing system calculates a tab print region (coordinates) where a protruding tab exists. The calculated tab print region is stored in the index sheet attributes of the book.

Step S1403 indicates the start of loop processing. Step S1414 indicates the end of loop processing. The process steps from step S1404 process each page of the input electronic document file.

In step S1404, the document processing system checks the electronic document file and determines whether it is tab document data. The determination method will be described later. If the electronic document file is tab document data, the process advances to step S1405. If the electronic document file is not tab document data, the process advances to step S1413.

In step S1405, the document processing system determines whether the tab flag is ON. The tab flag is used to determine whether to receive tab document data continuously. A value represented by the flag is stored in the memory. The initial value of the tab flag is OFF.

The tab flag is turned on when the document processing system has received tab document data. Whether to receive tab document data continuously is checked in consideration of double-sided printing of tab sheets. If obverse-side data is determined as tab document data, the document processing system determines whether reverse-side data is also tab document data. If the tab flag is ON, the process advances to step S1407.

If the tab flag is OFF, the process advances to step S1406. In step S1406, the document processing system segments chapters at the position of the tab document data to print it on a tab sheet.

In step S1407, the document processing system determines whether the electronic document file is reverse-side tab document data. Details of the determination method will be described later.

In step S1408, the document processing system turns off the tab flag. In step S1409, the document processing system recognizes, out of the tab document data, data (tab print content) to be printed on a protruding tab. Details of the processing method will be described later.

In step S1410, the document processing system determines whether the position (data position) of the tab print content recognized in step S1409 matches the protruding tab position (tab position).

The document processing system can calculate the tab position of a chapter based on the position of the chapter and the tab sheet information. For example, when tab sheets for a 4-tab configuration are used, the data of the sixth chapter is printed on the second tab based on 6÷4=1 with a remainder of 2. If the tab print content matches the tab position, the process advances to step S1412. If the tab print content does not match the tab position, the process advances to step S1411.

That is, the process in step S1410 indicates determining, based on the acquired tab sheet information and the document data containing tab print data to be printed on the protruding tab of a tab sheet, whether the tab print data is allocated on the protruding tab of a tab sheet.

In step S1411, the document processing system shifts the position (data position) of the tab print content such that it matches the tab position. Details of the processing method will be described later.

In step S1412, the document processing system turns on the tab flag. In step S1413, the document processing system turns off the tab flag.

Step S1414 indicates the end of loop processing. When the processing up to step S1413 has ended, the document processing system repeatedly executes the process from step S1404 for the next electronic document file. If the processing has ended up to the last page of the electronic document file, the document processing system finishes the loop, and the process advances to step S1415.

In step S1415, the document processing system initializes flag data.

Flag data here includes a tab flag to determine continuous tab document data and a reverse-side tab document flag to determine whether data is reverse-side tab document data. The document processing system returns both flags to initial values.

<4.2 Tab Document Data Determination Processing>

Figure 15:
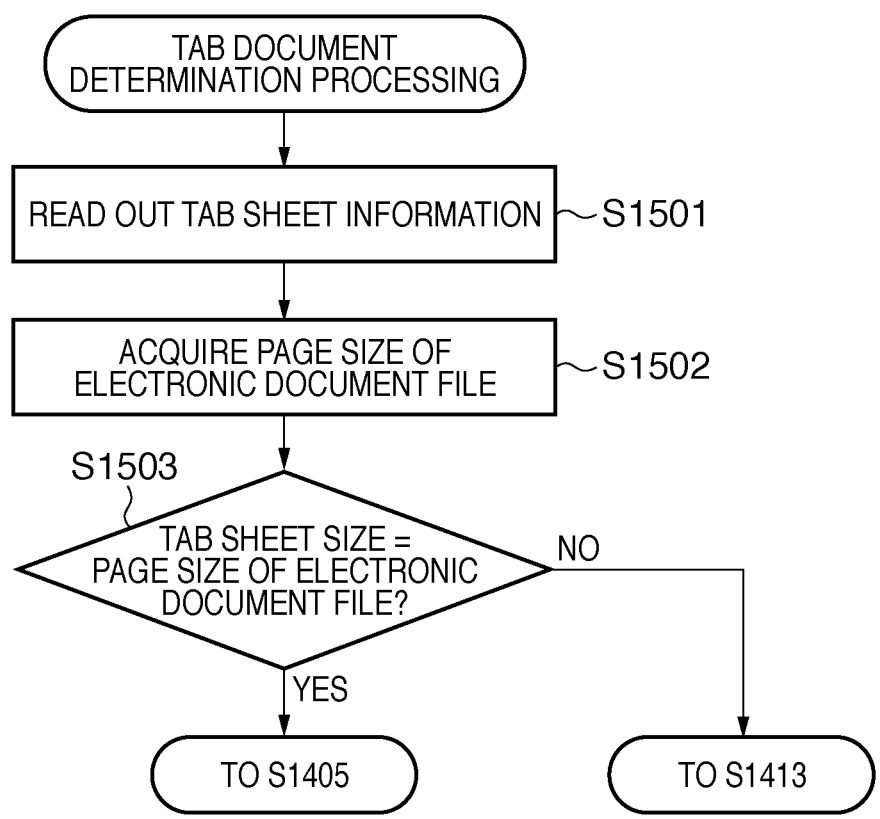
FIG. 15 is a flowchart illustrating the sequence of tab document data determination processing.

FIG. 15 is a flowchart illustrating the sequence of tab document data determination processing in step S1404 of FIG. 14 described above. The processes will be described.

In step S1501, the document processing system reads out the tab sheet information stored in steps S1401 and S1402. The readout information is rasterized on the work memory, and the subsequent processing is executed.

Note that the tab sheet information may be read out every time the flowchart is executed. Alternatively, the tab sheet information may be read out only once, and the readout information may be kept rasterized on the memory while the document processing system is being activated. In the latter case, this processing can be skipped.

In step S1502, the document processing system acquires the page size of the electronic document file. In step S1503, the document processing system compares the tab sheet size of the tab sheet information read out in the preceding process step with the page size of the electronic document file.

If the tab sheet size of the tab sheet information equals the page size of the electronic document file, the data is determined to be tab document data, and the process advances to step S1405. If the tab sheet size of the tab sheet information is different from the page size of the electronic document file, the data is determined not to be tab document data, and the process advances to step S1413.

<4.3 Reverse-Side Tab Document Data Determination Processing>

Figure 16:
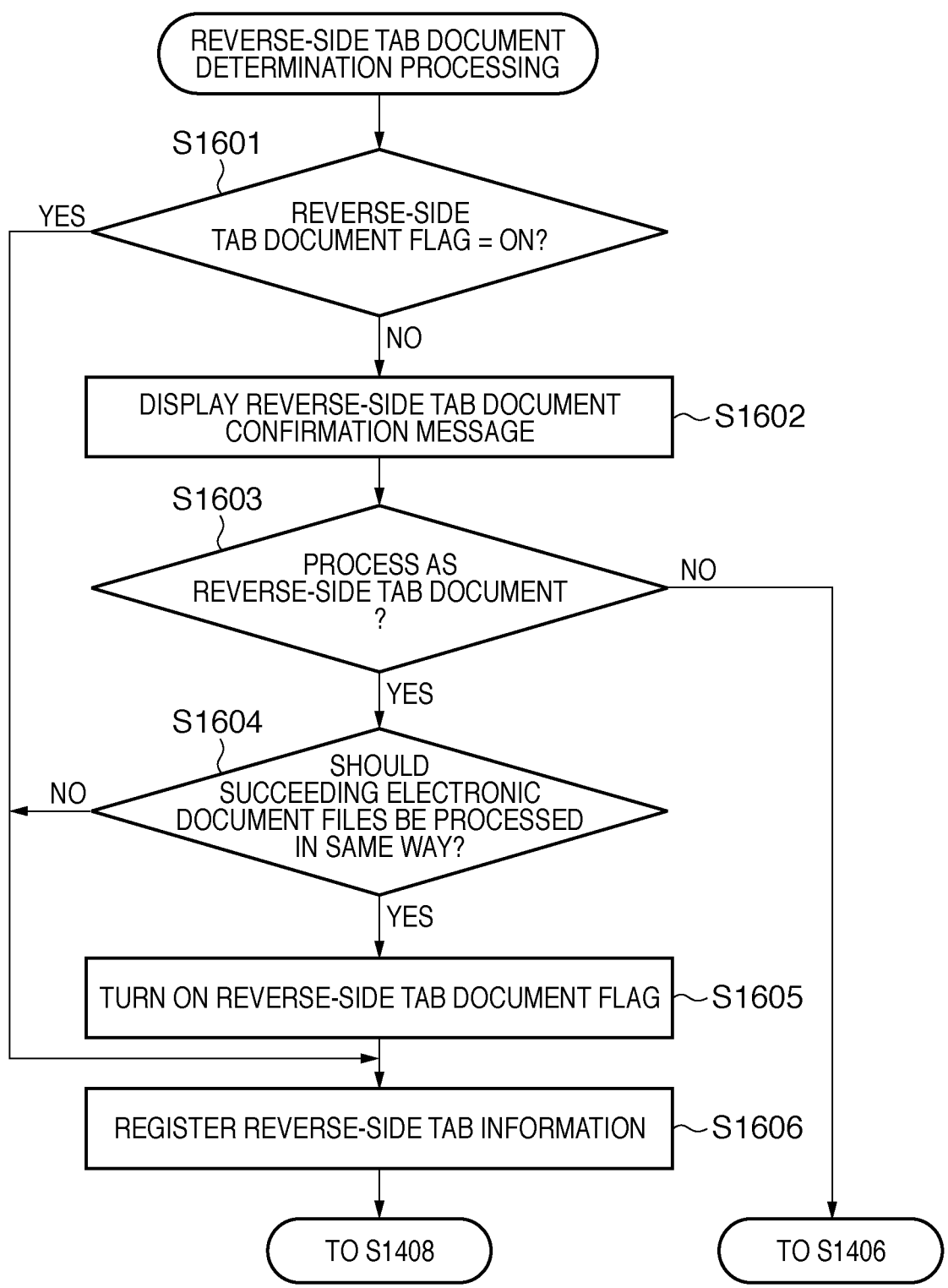
FIG. 16 is a flowchart illustrating the sequence of processing of determining whether an electronic document file is reverse-side tab document data.

FIG. 16 is a flowchart illustrating the sequence of processing of determining whether the electronic document file is reverse-side tab document data in step S1407 of FIG. 14 described above. The processes will be described. In step S1601, the document processing system determines whether the reverse-side tab document flag is ON (printing surface determination). The reverse-side tab document flag is a flag to determine whether to display a reverse-side document confirmation message for the next process. The initial value is OFF.

If the reverse-side tab document flag is ON, the process advances to step S1606. If the reverse-side tab document flag is OFF, the process advances to step S1602. In step S1602, the document processing system displays a reverse-side tab document confirmation message. The document processing system displays the reverse-side tab document confirmation message to prompt the user to decide the reverse-side tab document processing method.

Figure 17:
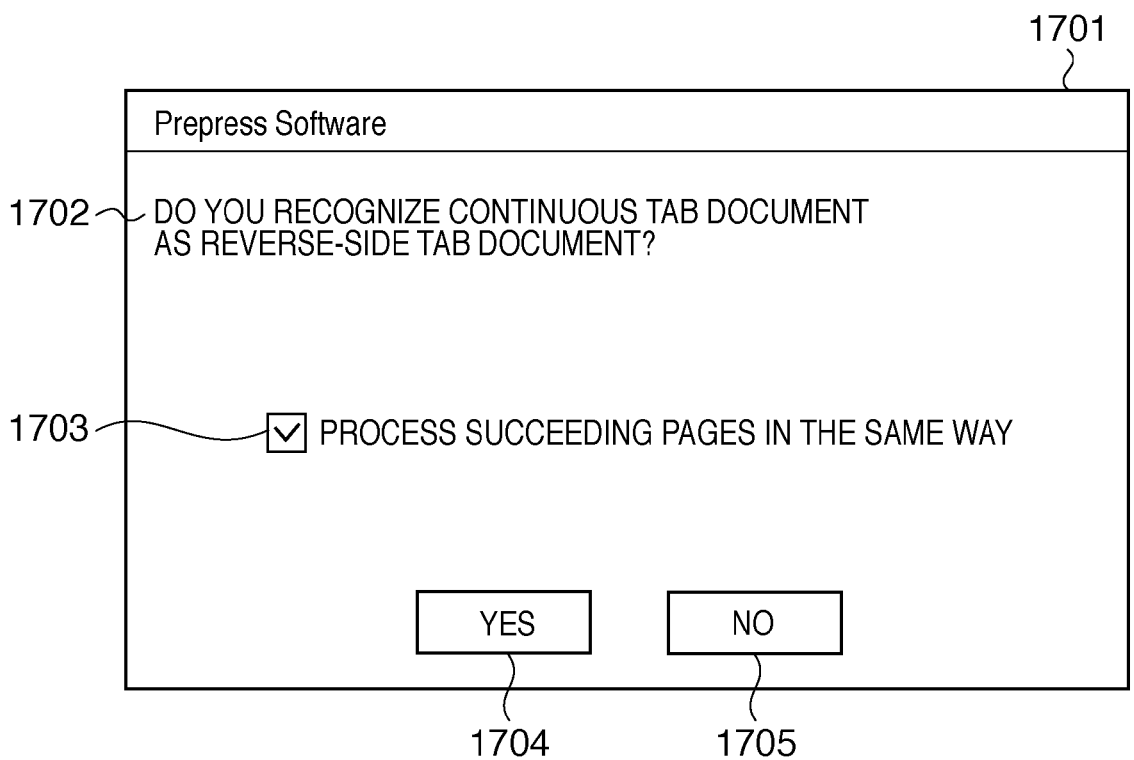
FIG. 17 is a view showing an example of a reverse-side tab document confirmation message.

FIG. 17 is a view showing an example of the reverse-side tab document confirmation message. Reference numeral 1701 denotes an outer appearance of the reverse-side tab document confirmation message; and 1702, a message text of the reverse-side tab document confirmation message. This message is displayed when tab document data continuously appear.

The reverse-side tab document confirmation message has a check box 1703. The check box is used to designate whether to apply the contents determined here by the user to succeeding electronic document files. The check box is added in consideration of the convenience of the user, and need not always be prepared.

The user presses a "YES" button 1704 to agree to the contents of the message and advance the process. The user presses a "NO" button 1705 to advance the process without agreeing to the contents of the message.

In step S1603, the document processing system determines whether to process the data as a reverse-side tab document. Upon detecting that the user has pressed the "YES" button in the reverse-side tab document confirmation message displayed in step S1602, the document processing system determines that the data is a reverse-side tab document, and the process advances to step S1604.

Upon detecting that the user has pressed the "NO" button in the reverse-side tab document confirmation message displayed in step S1602, the document processing system determines that the data is not a reverse-side tab document, and the process advances to step S1406.

In step S1604, the document processing system determines whether to do the same determination for succeeding electronic document files.

Upon detecting that the check box is ON in the reverse-side tab document confirmation message displayed in step S1602, the document processing system determines that succeeding electronic document files should be processed in the same way, and the process advances to step S1605.

Upon detecting that the check box is OFF in the reverse-side tab document confirmation message displayed in step S1602, the document processing system determines not to process succeeding electronic document files in the same way, and the process advances to step S1606.

In step S1605, the document processing system turns on the reverse-side tab document flag. In step S1606, the document processing system registers the reverse-side tab information in the tab print content information.

FIG. 18 is a view showing an example of tab print content information. One piece of tab print content information is prepared in correspondence with one tab document data. The tab print content information is stored in the memory during book file editing. When the book file is stored, the tab print content information is stored and held in the book file. The tab print content information has, as attribute values, a tab print content attribute, tab position attribute, and reverse-side tab information attribute.

The tab print content attribute and the tab position attribute register information recognized in tab print content recognition processing to be described later. The reverse-side tab information attribute registers information representing whether tab document data is reverse-side data.

In step S1606, the document processing system designates, in the reverse-side tab information of the tab print content information corresponding to the tab document data, that the tab document data is reverse-side data. When the process in step S1606 has ended, the process advances to step S1408.

<4.4 Tab Print Content Recognition Processing>

Figure 19:
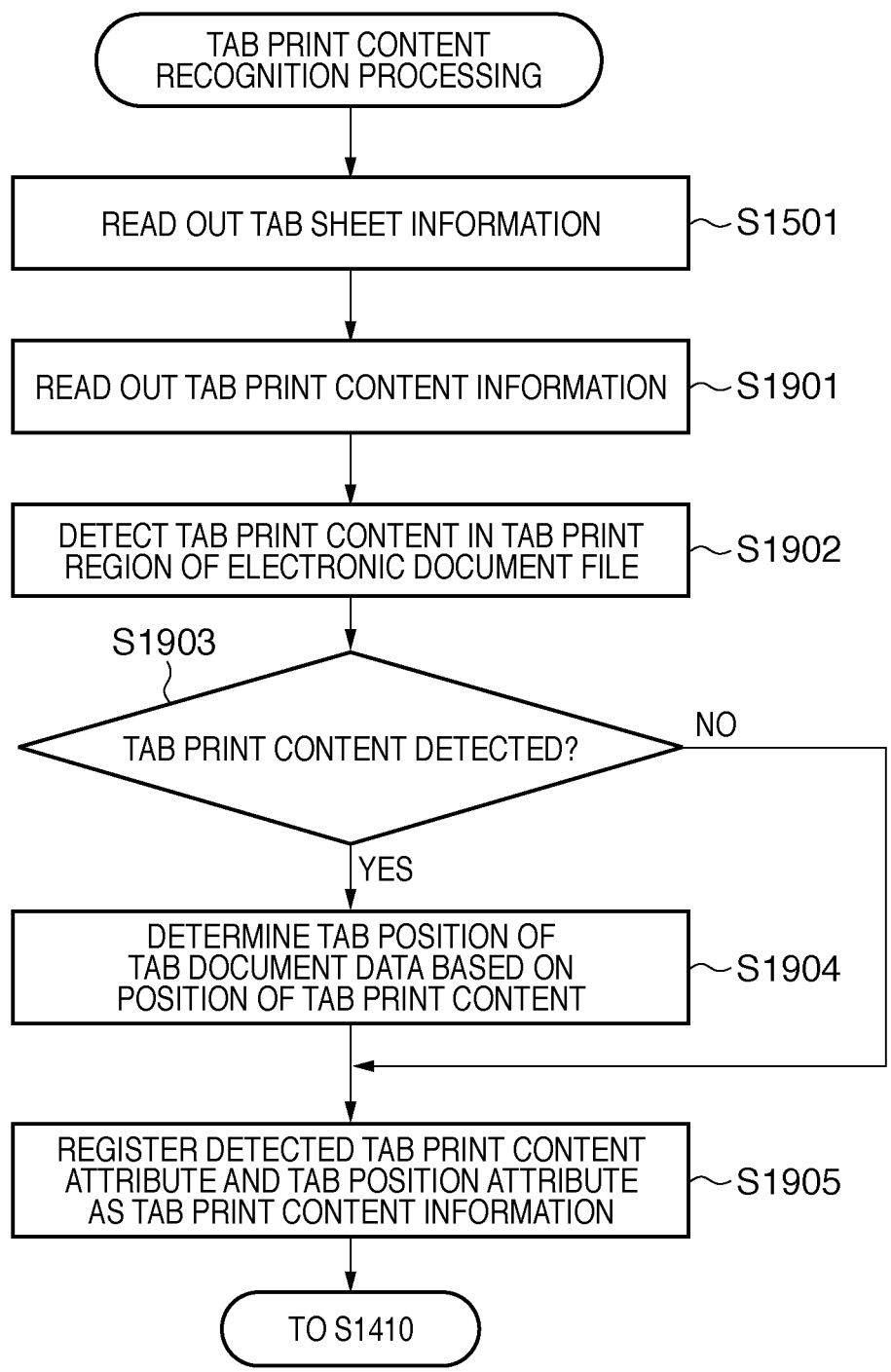
FIG. 19 is a flowchart illustrating the sequence of tab print content recognition processing.

FIG. 19 is a flowchart illustrating the sequence of tab print content recognition processing in step S1409 of FIG. 14 described above. The processes will be described. Step S1501 is the same as the above-described tab sheet information readout processing.

The tab sheet information may be read out every time the flowchart is executed. Alternatively, the tab sheet information may be read out only once, and the readout information may be kept rasterized on the memory while the document processing system is being activated. In the latter case, this processing can be skipped.

In step S1901, the document processing system reads out the tab print content information. The readout information is rasterized on the work memory, and the subsequent processing is executed.

In step S1902, the document processing system detects a tab print content in the tab print region of the electronic document file. As the detection information, the document processing system scans the content position information of the electronic document file, and detects a content located in the tab print region of the readout tab sheet information.

Upon determining based on the reverse-side tab information of the tab print content information read out in step S1901 that the tab document data is reverse-side data, the document processing system converts the scanned tab print region to a position opposite to the binding side, thereby detecting a content.

Figure 20:
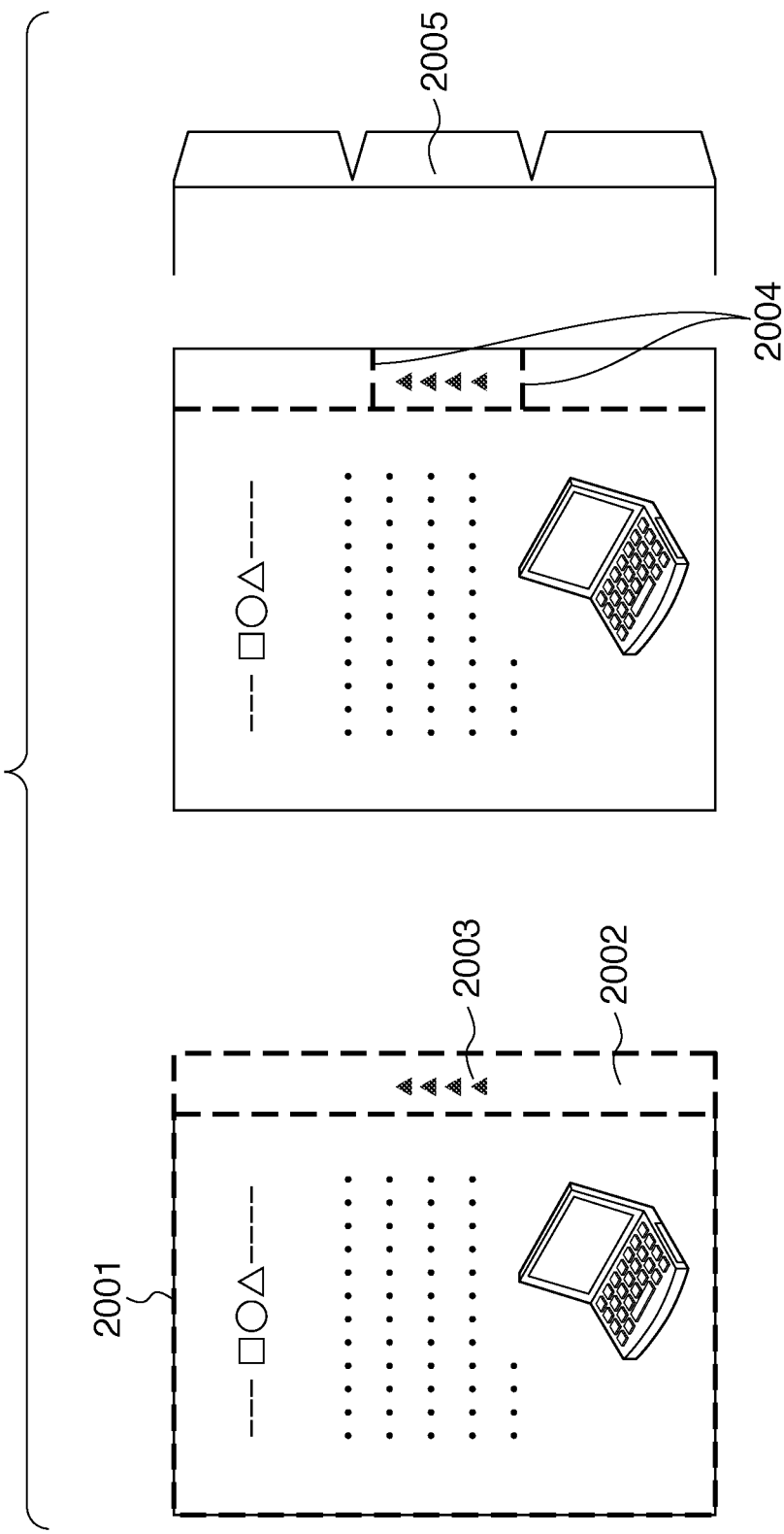
FIG. 20 is a view for explaining processing of detecting a content in a tab print region.

FIG. 20 is a view for explaining processing of detecting a content in a tab print region. Reference numeral 2001 denotes tab document data; and reference numeral 2002, a tab print region. The document processing system scans the content position information of the tab document data and determines whether a content exists in the tab print region 2002.

If a content of the tab document data exists in the tab print region, the content is detected as a tab print content. The tab print region does not necessarily include only one content (also called tab print data) 2003. If a plurality of contents exists, all of them are detected.

In step S1903, the document processing system determines whether a tab print content is detected in the tab print region.

If at least one tab print content is detected in the tab print region in step S1902, the process advances to step S1904.

If no tab print content is detected in the tab print region in step S1902, the process advances to step S1905.

In step S1904, the document processing system determines the tab position of the tab document data based on the position information of the detected tab print content. In the determination, the document processing system calculates the range of the tab print content in the tab print region based on the sum of the positions of one or more tab print contents detected in step S1902.

The range is calculated as position information in the electronic document file. The document processing system then determines which tab position corresponds to the range of the detected tab print content in the tab print region. Reference numeral 2004 in FIG. 20 denotes a print range of the tab print content.

Reference numeral 2005 in FIG. 20 indicates a conceptual view of a protruding tab calculated based on the protruding tab position information registered in the tab sheet information (it is merely a conceptual view assumed based on the protruding tab position information, and the protruding tab is not created actually). Based on the tab print content print range 2004 and the protruding tab position information, the document processing system determines the protruding tab where the tab print content should be printed. In the example shown in FIG. 20, since the tab print content falls within the range of the second protruding tab 2005, the position is determined as the second tab. Note that the protruding tab 2005 in FIG. 20 assumes a set of three tab sheets. If the user sets a set of four tab sheets, tab sheet information about the set of four tab sheets is used in the determination processing in step S1904.

In step S1905, the document processing system registers, as the tab print content information shown in FIG. 18, the information of the tab print content detected in step S1902 and the tab position determined in step S1904.

Upon determining in step S1903 that no tab print content is detected, for example, NULL information is registered in step S1905. When the process in step S1905 has ended, the process advances to step S1410.

<4.5 Tab Print Content Shift Processing>

Figure 21:
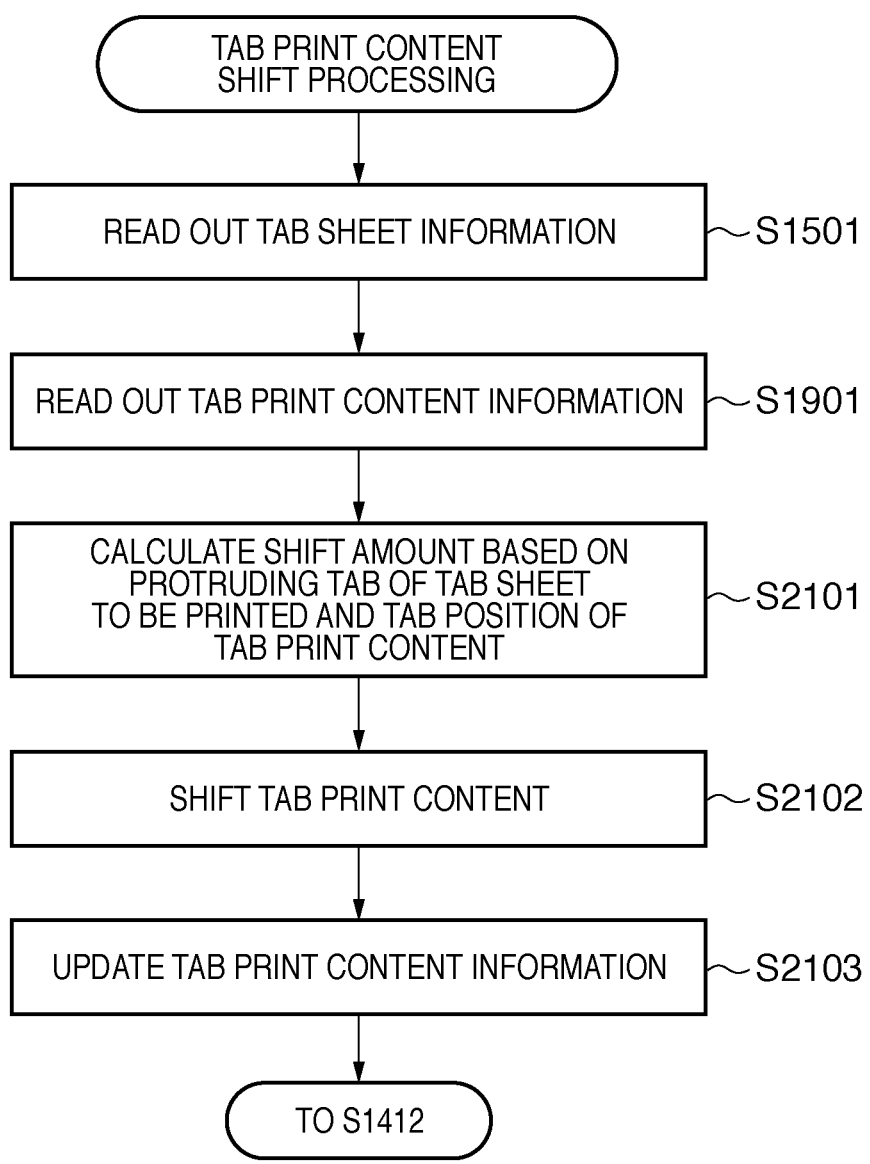
FIG. 21 is a flowchart illustrating the sequence of tab print content shift processing.

FIG. 21 is a flowchart illustrating the sequence of tab print content shift processing in step S1411 of FIG. 14 described above. The processes will be described.

Step S1501 is the same as the above-described tab sheet information readout processing. The tab sheet information may be read out every time the flowchart is executed. Alternatively, the tab sheet information may be read out only once, and the readout information may be kept rasterized on the memory while the document processing system is being activated. In the latter case, this processing can be skipped.

In step S1901, the document processing system reads out the tab print content information. The process in step S1901 is the same as the above-described process.

In step S2101, the document processing system compares the protruding tab of the tab sheet to be printed with the tab position of the tab print content and calculates the tab print content shift amount.

In step S1410 described above, the position of the protruding tab where the tab print content should be printed is derived from the tab sheet information and the position of the chapter in which the tab document data of the electronic file is imported. In step S2101, the shift amount is derived from the position of the protruding tab and the tab position attribute of the tab print content information registered in the above-described tab print content recognition processing.

In step S2102, the document processing system shifts the position of the tab print content based on the shift amount calculated in step S2101.

Figure 22:
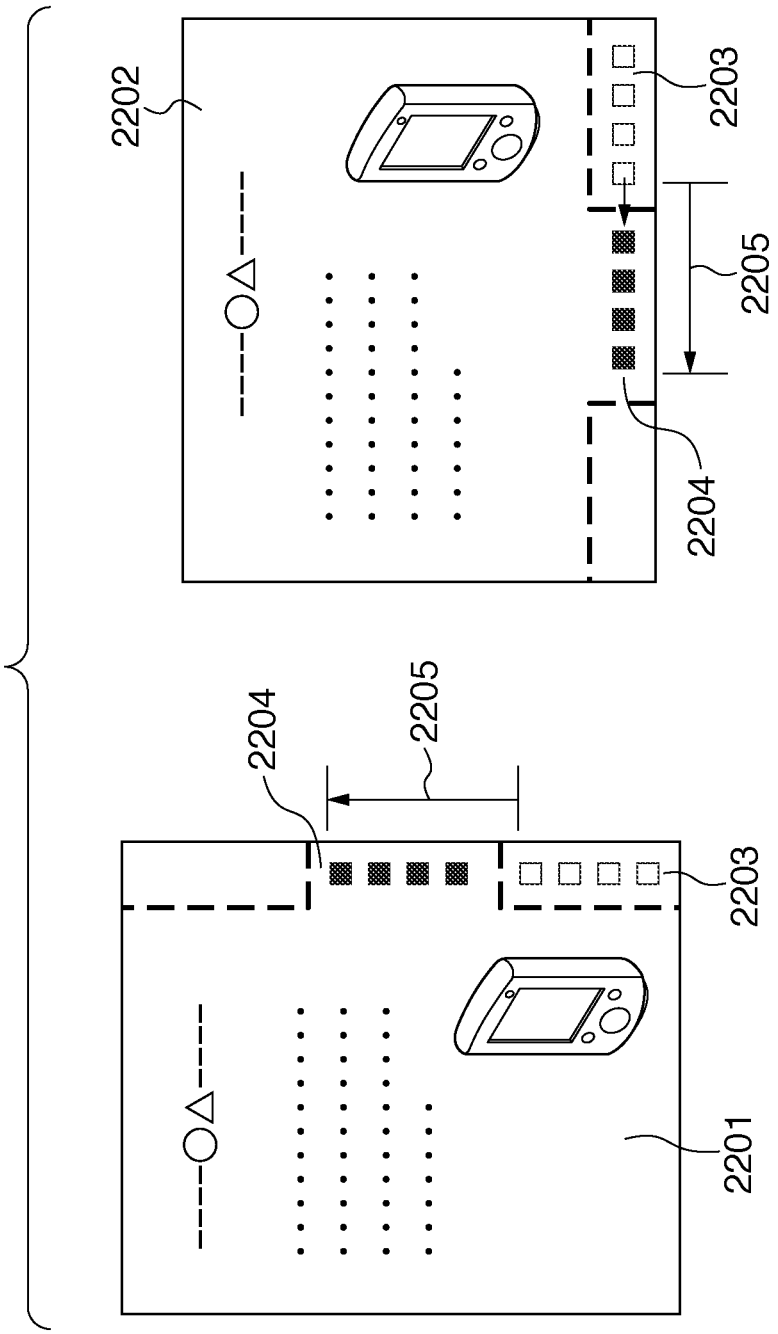
FIG. 22 is a view showing the concept of tab print content shift amount calculation and shift processing.

FIG. 22 is a view showing the concept of tab print content shift amount calculation and shift processing. Tab document data 2201 of an electronic document file of left binding has a protruding tab on the right side. Tab document data 2202 of an electronic document file of top binding has a protruding tab on the bottom side. In FIG. 22, each protruding tab is located at a position opposite to the binding side. However, a tab may be located on a side perpendicular to the binding direction.

Reference numeral 2203 denotes a tab print content of tab document data. In the case shown in FIG. 22, the tab print content of the tab document data exists at the position of the third tab. However, the print target protruding tab calculated based on the position of the chapter in which the tab document data is inserted is the second tab.

Hence, a difference 2205 is calculated, and the tab print content 2203 is shifted. Reference numeral 2204 denotes a shifted tab print content.

In step S2103, the document processing system registers, in the tab print content information, the position information of the tab print content shifted in step S2102, thereby updating the tab print content information. When the process in step S2103 has ended, the process advances to step S1412.

With the above-described processing, the document processing system can derive a shift amount necessary for allocating the tab print data on the protruding tab of the tab sheet based on the acquired tab sheet information and the document data including the tab print data.

In this embodiment, when an electronic document file is received, the document processing system determines whether a protruding tab position matches a tab print content position, as is apparent from the above description. Upon determining that a protruding tab position does not match a tab print content position, the document processing system shifts the position of the tab print content.

This makes it possible to automatically correct the shift between the protruding tab position and the tab print content position and reduce operation load on the user.

[Second Embodiment]

In the first embodiment, the document processing system determines whether a protruding tab position matches a tab print content position at the time of electronic document file reception. However, the present invention is not limited to this.

For example, when a user manipulates the chapter configuration of a book file, the protruding tab position may shift from the tab print content position. In the second embodiment, it is determined whether a protruding tab position matches a tab print content position even when a user has manipulated the chapter configuration of a book file. Tab print optimization processing in a chapter configuration change operation will be explained below.

Figure 23:
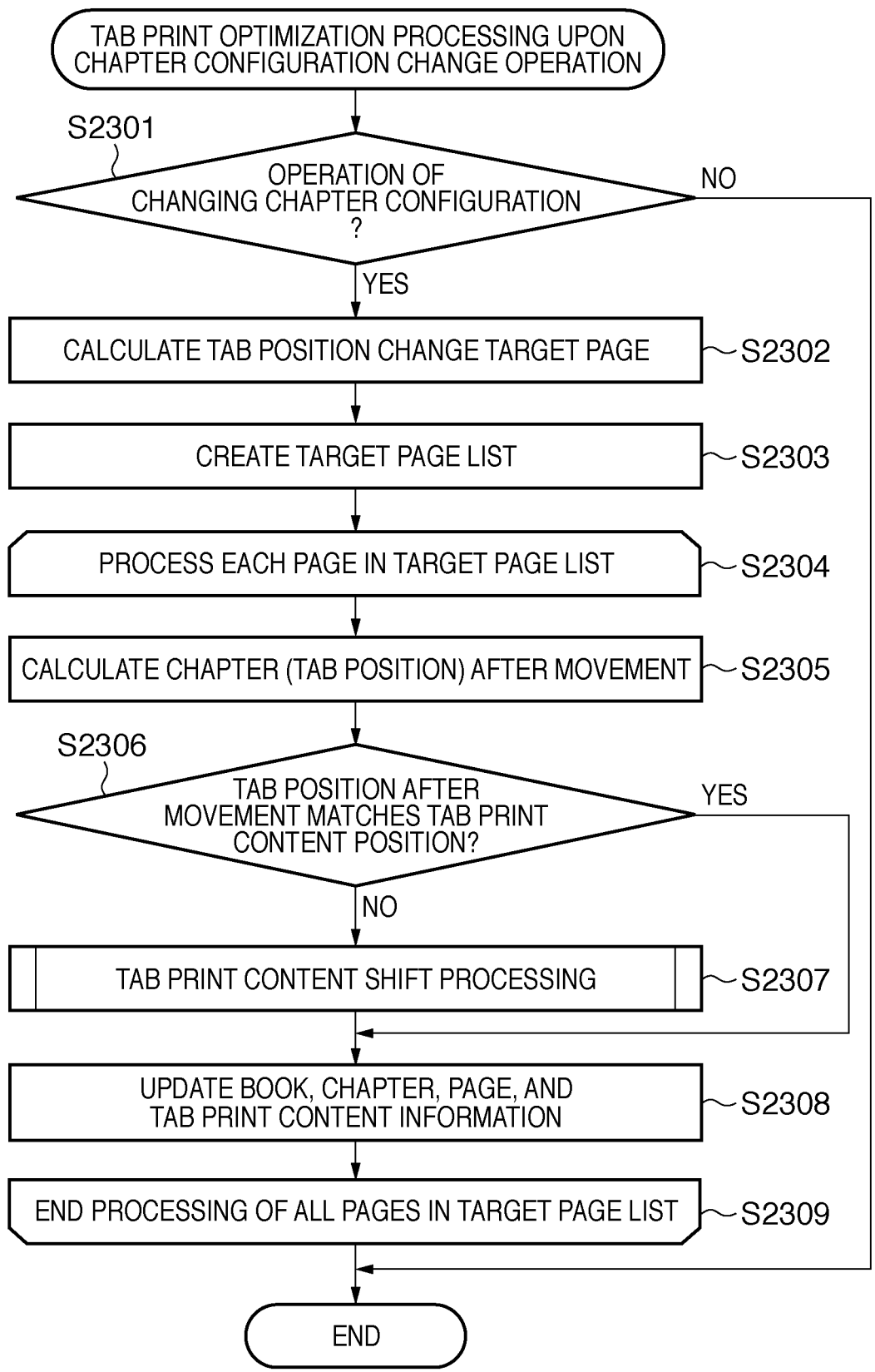
FIG. 23 is a flowchart illustrating the sequence of tab print content shift processing to be executed when a chapter configuration change operation has occurred.

FIG. 23 is a flowchart illustrating the sequence of tab print content shift processing to be executed when a chapter configuration change operation has occurred. The processes will be described.

In step S2301, the document processing system detects an edit operation that affects the chapter configuration.

In this embodiment, the chapter configuration change operation indicates an operation (configuration change operation) of changing the chapter configuration and page configuration. Detailed examples are chapter move, chapter delete, and chapter addition. When the user has executed the chapter configuration change operation, and the document processing system has detected updating of the lists of chapter and page attributes, the process advances to step S2302. If the document processing system has detected no updating of the list of page attributes having tab print content information, the processing ends without executing the processes of the flowchart.

In step S2302, the document processing system calculates the tab position change target page. The document processing system calculates tab document data in which the tab print position is changed by the chapter configuration change operation detected in step S2301. For example, if the second chapter is deleted from an electronic document file having 10 chapters, all tab document data after the second chapter are affected. Hence, the tab document data after the second chapter are specified as tab position change target pages.

In step S2303, the document processing system collects the tab document data calculated in step S2302 and creates a target page list.

Step S2304 indicates the start of loop processing. Step S2309 indicates the end of loop processing. The process steps from step S2305 are executed for each page of the tab document data registered in the target page list created in step S2303.

In step S2305, the document processing system calculates the position of the chapter to which the tab document data is moved by the chapter configuration change operation and the position of the protruding tab in it. For example, if the tab document data of the fifth chapter is moved to the second chapter by the chapter configuration change operation, the document processing system calculates the protruding tab position in the second chapter after the movement. If tab sheets for a 4-tab configuration are used, the protruding tab of the tab document data of the fifth chapter that has moved to the second chapter is calculated as the second tab position based on 2÷4=0 with a remainder of 2. Note that the position of the protruding tab before the movement is held as the tab position attribute of the tab print content information.

In step S2306, the document processing system compares the moved protruding tab position calculated in step S2305 with the data position of the tab position attribute of the tab print content information. If the moved protruding tab position matches the data position of the tab position attribute of the tab print content information, the process advances to step S2308. If the moved tab position does not match the data position of the tab position attribute of the tab print content information, the process advances to step S2307.

In step S2307, the document processing system shifts the tab print content. The shift processing is necessary because the moved tab position does not match the tab print content position. The contents of the tab print content shift processing are the same as in the flowchart of FIG. 21 described above, and a description thereof will not be repeated.

In step S2308, the document processing system updates the book, chapter, page, and tab print content information. The document processing system updates the book, chapter, and page information changed by the chapter configuration change operation and the information of the tab position and the like which are changed by the tab print content shift processing.

Step S2309 indicates the end of loop processing. When the processing up to step S2308 has ended, the document processing system repeatedly executes the process from step S2305 for the next page in the target page list.

In this embodiment, when the chapter configuration change operation is executed in a book file, and a protruding tab position shifts from a tab print content position, the tab print content position is shifted, as is apparent from the above description.

This makes it possible to automatically correct the shift between the protruding tab position and the tab print content position and reduce the operation load on the user.

[Third Embodiment]

In the second embodiment, the shift between a protruding tab position and a tab print content position is determined in the chapter configuration change operation. If a positional shift is detected, the tab print content position is shifted. However, the present invention is not limited to this.

For example, when a user performs, of the chapter configuration change operation, a delete operation that causes a positional shift, dummy tab document data may be created to avoid the positional shift. This embodiment will be described below in detail.

Figure 24:
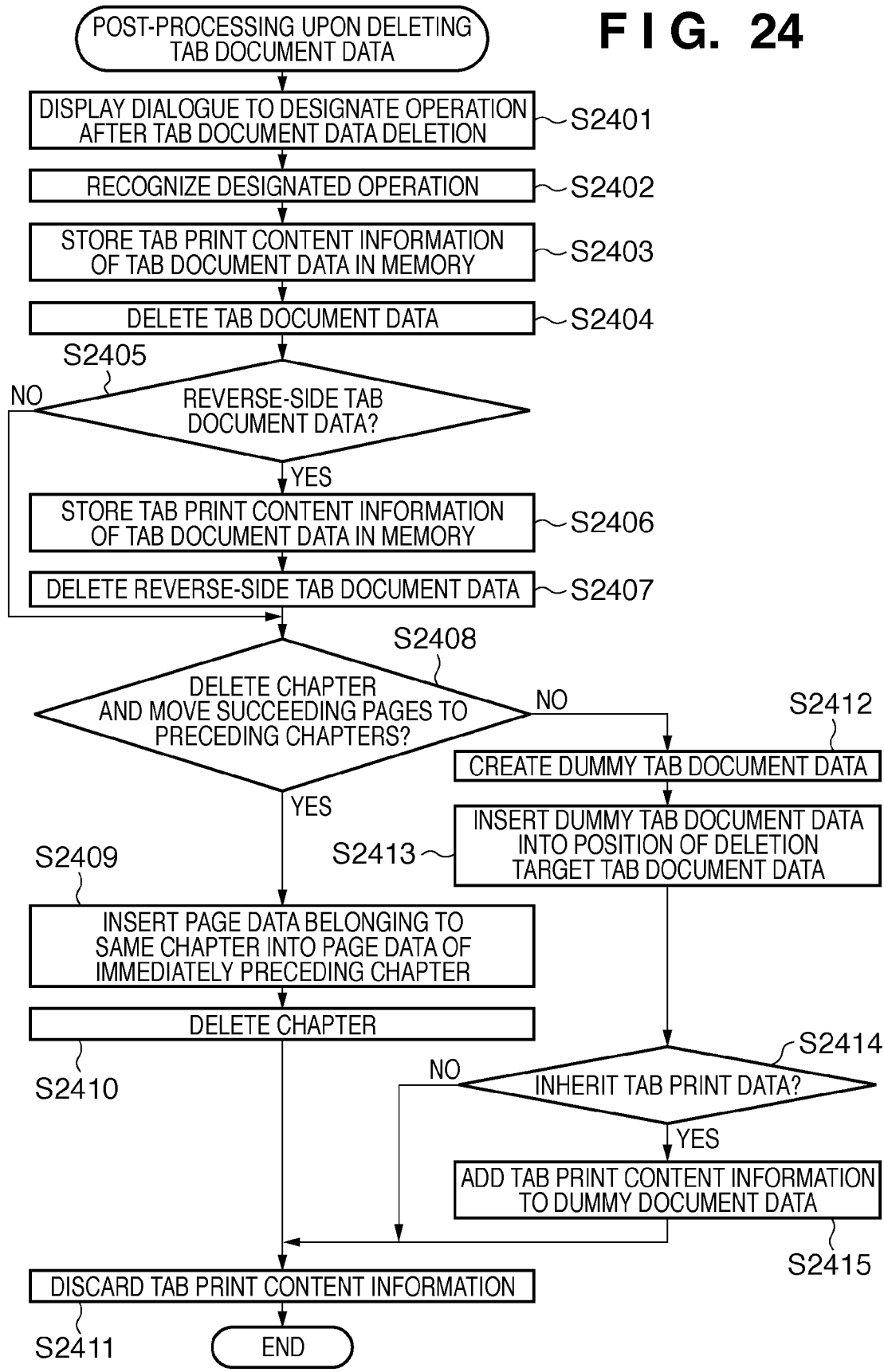
FIG. 24 is a flowchart illustrating the sequence of post-processing at the time of tab document data deletion.

FIG. 24 is a flowchart illustrating the sequence of post-processing to be executed by a document processing system of the third embodiment when tab document data has been deleted. The processes will be described. Note that this processing is performed only when a tab document data delete operation has been performed. For this reason, the flowchart starts immediately after the document processing system has detected the tab document data delete operation.

In step S2401, the document processing system displays a dialogue to designate an operation after tab document data deletion. The operation after tab document data deletion is executed in accordance with an instruction from the user who makes a choice among several alternatives presented. The operation after tab document data deletion may be designated in advance in, for example, the configuration of the document processing system. In this embodiment, an example will be explained in which the operation designation dialogue is displayed to ask for a user instruction at the time of tab document data deletion.

Figure 25:
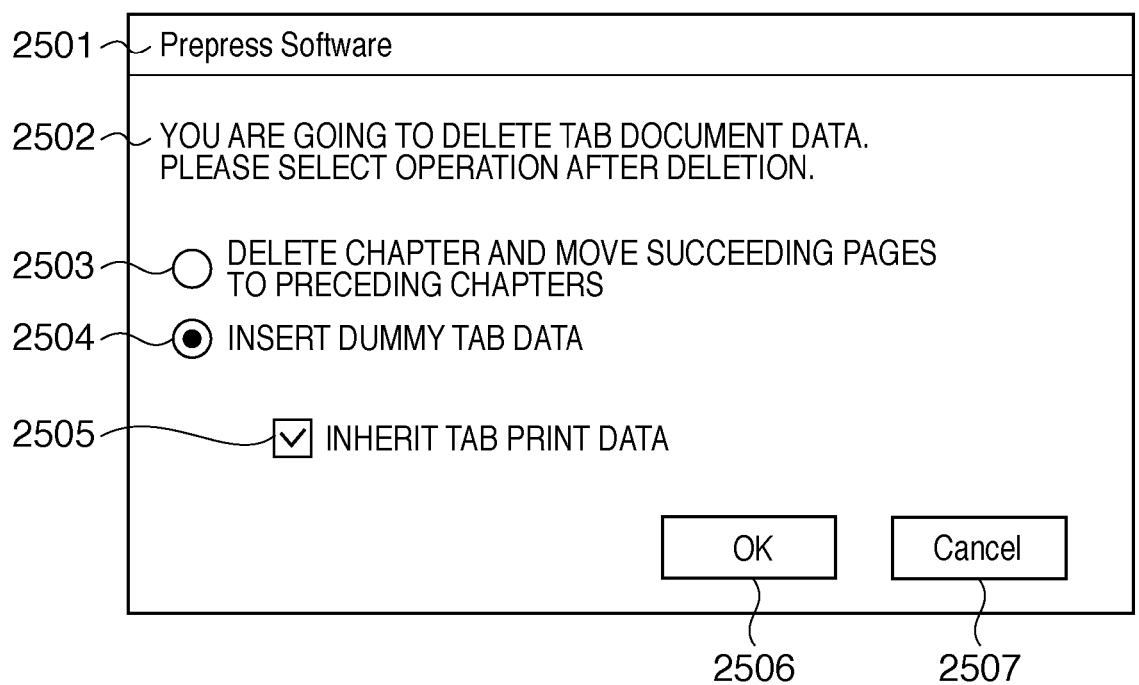
FIG. 25 is a view showing the outer appearance of an operation designation dialogue displayed after tab document data has been deleted.

Reference numeral 2501 in FIG. 25 represents an outer appearance of the operation designation dialogue displayed after tab document data deletion. A message 2502 indicates the contents of the instruction of the dialogue. The dialogue makes the user to designate the operation after tab document data has been deleted, and therefore displays "You are going to delete tab document data. Please select operation after deletion" as the message 2502. However, the message to be displayed is not limited to this, and any other message is usable if it tells the instruction contents.

A radio button 2503 causes the user to designate "delete a chapter and move succeeding pages to preceding chapters" as an operation after tab document data deletion. A radio button 2504 causes the user to designate "insert dummy tab data" as another operation after tab document data deletion.

A check box 2505 causes the user to designate "inherit tab print data" as a supplementary function of "insert dummy tab data". When the radio button 2503 is designated, the check box control 2505 is disabled without a check mark because it is the supplementary function of the radio button 2504.

The user presses an OK button 2506 to execute the processing designated by the radio button 2503 or the radio button 2504 and the check box 2505. The user presses a cancel button 2507 to cancel the instruction in the dialogue and end the tab document data delete operation. The operation after tab document data deletion will be described later.

In step S2402, the document processing system recognizes the operation designated in the operation designation dialogue displayed in step S2401. In step S2403, the document processing system stores, in the memory, the tab print content information of the tab document data to be deleted.

In step S2404, the document processing system deletes the tab document data to be deleted. In step S2405, the document processing system determines whether a reverse-side tab document exists. More specifically, the document processing system determines whether the next page of the deleted tab document data is reverse-side tab document data. If it is reverse-side tab document data, the process advances to step S2406. If it is not reverse-side tab document data, the process advances to step S2408.

In step S2406, the document processing system executes the same process as in step S2403 for the reverse-side tab document data. In step S2407, the document processing system deletes the reverse-side tab document data.

In step S2408, the document processing system determines whether the processing after tab document data deletion is processing of "deleting a chapter and moving succeeding pages to preceding chapters". This determination is done by the document processing system based on the processing after tab document data deletion recognized in step S2402. If the processing after tab document data deletion is processing of "deleting a chapter and moving succeeding pages to preceding chapters", the process advances to step S2409. If the processing after tab document data deletion is not processing of "deleting a chapter and moving succeeding pages to preceding chapters", the process advances to step S2412.

In step S2409, the document processing system inserts document pages belonging to the same chapter as the deletion target tab document data in the document pages of the immediately preceding chapter. When tab document data is deleted, succeeding document pages (belonging to the deleted tab) are lost. Hence, the succeeding document pages are moved to the immediately preceding chapter and inserted in the chapter having tab document data.

In step S2410, the document processing system deletes the chapter in which the deletion target tab document data existed. In step S2411, the document processing system deletes the tab print content information of the deletion target tab document data.

Figure 27:
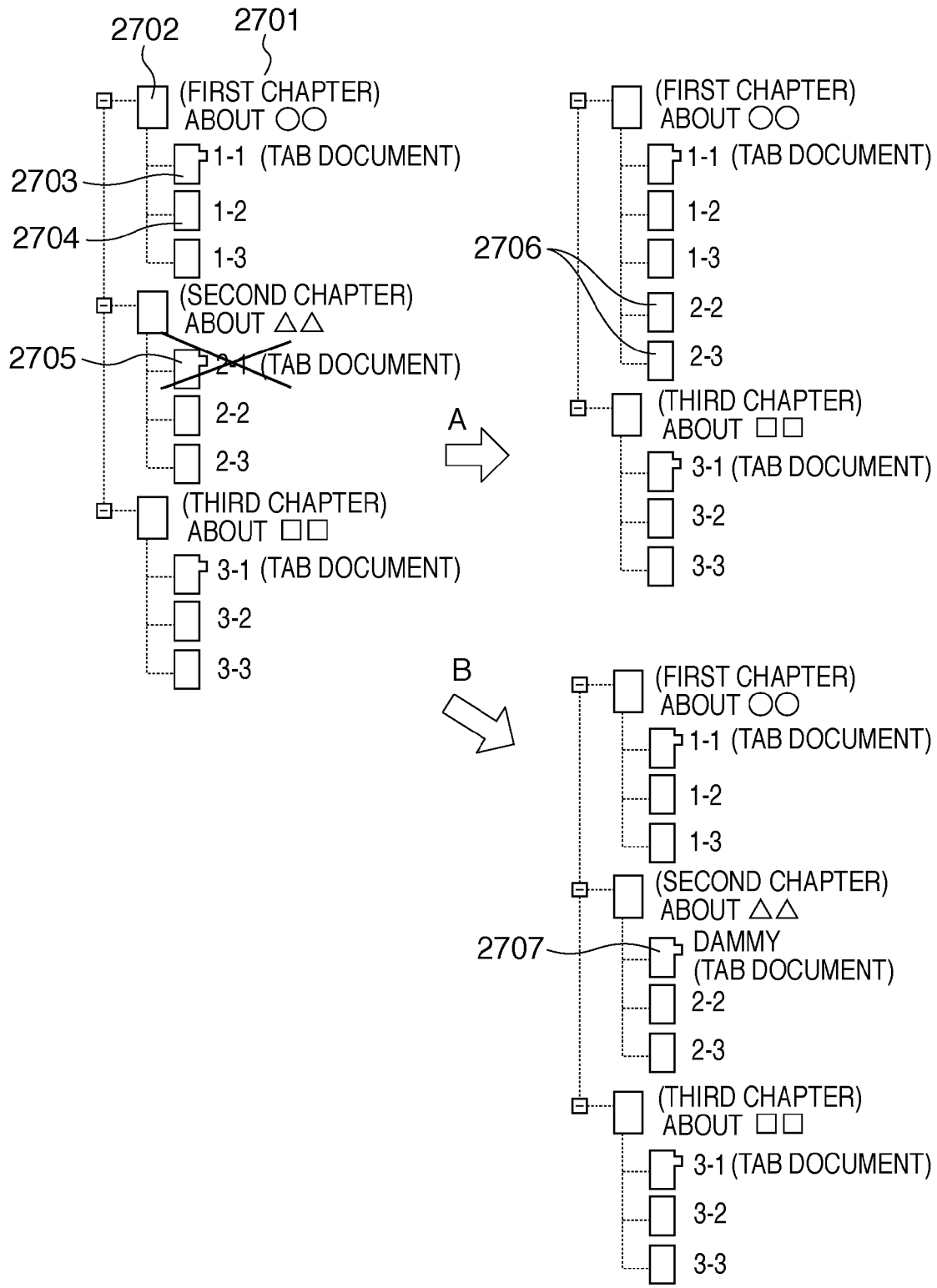
FIG. 27 is a view showing the concept of post-processing at the time of tab document data deletion.

FIG. 27 is a view showing the concept of post-processing at the time of tab document data deletion. A tree view 2701 of the document processing system indicates the configurations of a book, chapters, and pages. The whole tree view represents a book. Reference numeral 2702 denotes a chapter layer in the tree view; and 2703 and 2704, page layers in the tree view.

The page layer 2703 represents a page in which tab document data is laid out. The page layer 2704 represents a normal document page containing no tab document data. Each of A and B represents subsequent processing executed when a tab document data delete operation 2705 is detected. A indicates a case in which the processing after tab document data deletion is determined in step S2408 to be processing of "deleting a chapter and moving succeeding pages to preceding chapters".

Since the tab document data of the second chapter is deleted, document pages 2706 (2-2 and 2-3) following the tab document data of the second chapter are inserted in the page list of the first chapter. They are inserted at the end of the first chapter. The page numbers are updated automatically or in accordance with a user instruction. When the tab document data of the first chapter is deleted, there is no place to move the succeeding document pages. In this case, the user may be warned that movement is impossible. Alternatively, the processing may be changed to the processing B to be described later. The determination may be done in accordance with a user instruction.

In step S2412, the document processing system creates dummy tab document data in place of the deletion target tab document data. The dummy tab document data is blank data having the same page size as the deletion target tab document data but containing no tab print content.

In step S2413, the document processing system inserts the dummy tab document data created in step S2412 to the position of the deletion target tab document data.

In step S2414, the document processing system determines whether the processing after tab document data deletion is processing of "inheriting tab print data". This determination is done by the document processing system based on the processing after tab document data deletion recognized in step S2402. If the processing after tab document data deletion is processing of "inheriting tab print data", the process advances to step S2415. If the processing after tab document data deletion is not processing of "inheriting tab print data", the process advances to step S2411.

In step S2415, the document processing system adds the tab print content information stored in the memory in step S2403 to the dummy tab document data created in step S2412.

Reference numeral B in FIG. 27 indicates a case in which the processing after tab document data deletion is determined in step S2408 not to be processing of "deleting a chapter and moving succeeding pages to preceding chapters". That is, reference numeral B indicates a case in which the processing after tab document data deletion is processing of "inserting dummy tab data". Since the tab document data of the second chapter is deleted, dummy tab document data 2707 is inserted to the position of the tab document data of the second chapter.

Figure 26:
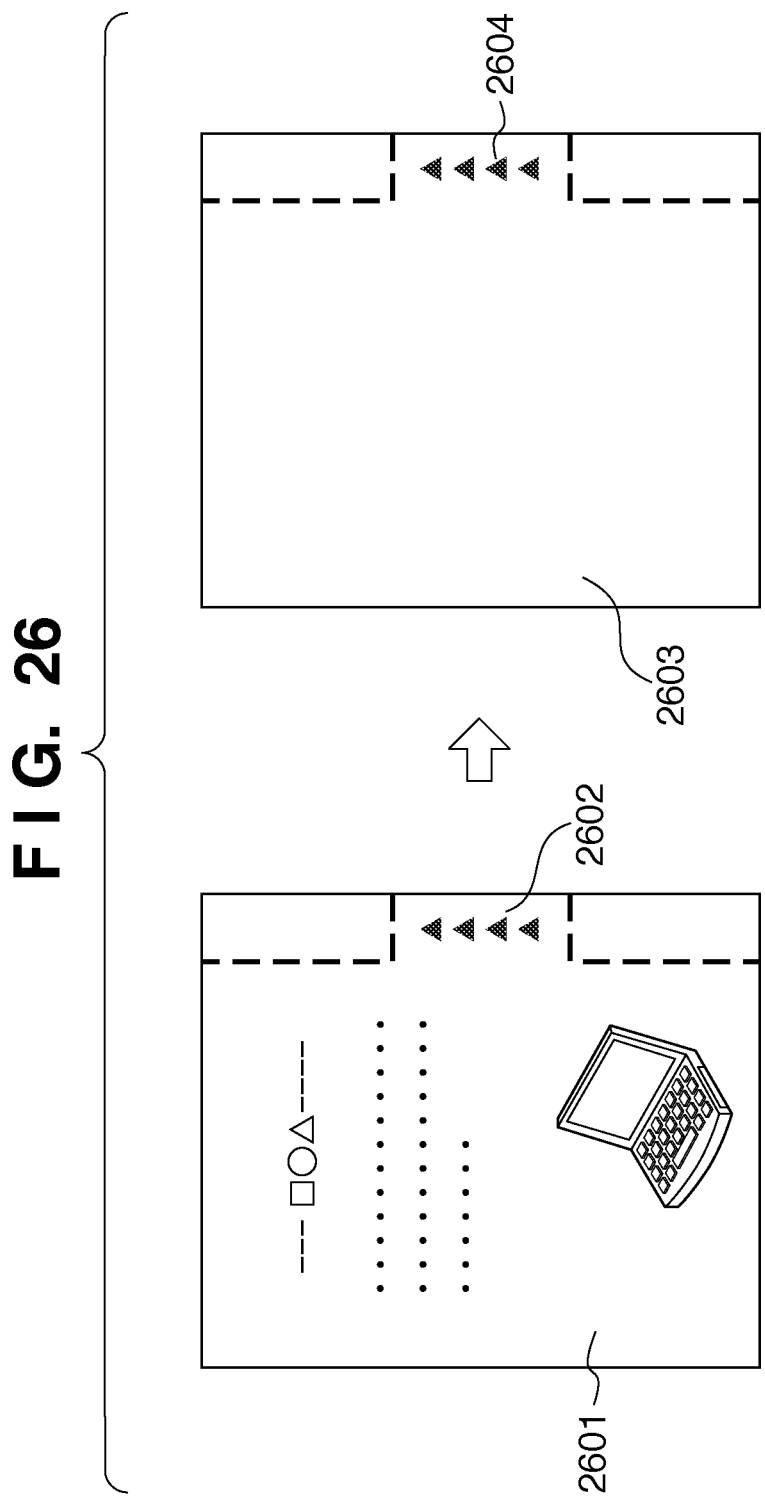
FIG. 26 is a view showing the concept of processing of adding tab print content information to dummy tab document data.

FIG. 26 is a view showing the concept of processing of adding tab print content information to dummy tab document data. Reference numeral 2601 denotes tab document data; reference numeral 2602, a tab print content; and reference numeral 2603, dummy tab document data corresponding to the tab document data 2601.

The dummy tab document data is blank data having the same page size as the tab document data but containing no content data. Tab print content information corresponding to the tab document data 2601 is added to the blank data. The blank data inherits attribute information such as the tab print content and the tab position contained in the tab print content information. Hence, a tab print content 2406 is added to the dummy tab document data 2603.

In this embodiment, when the user performs, of the chapter configuration change operation, the delete operation that generates a shift between a tab position and a tab print content position, dummy tab document data can be created, as is apparent from the above description. This allows preventing any positional shift in advance.

[Fourth Embodiment]

In the first embodiment, the document processing system determines whether a protruding tab position matches a tab print content position at the time of electronic document file reception. In the second and third embodiments, the determination is done when the user has performed the chapter configuration change operation in a book file.

However, the present invention is not limited to those. For example, whether a protruding tab position matches a tab print content position may be determined when changing the tabs. Tab print optimization processing to be executed when changing the tabs will be described below.

Figure 28:
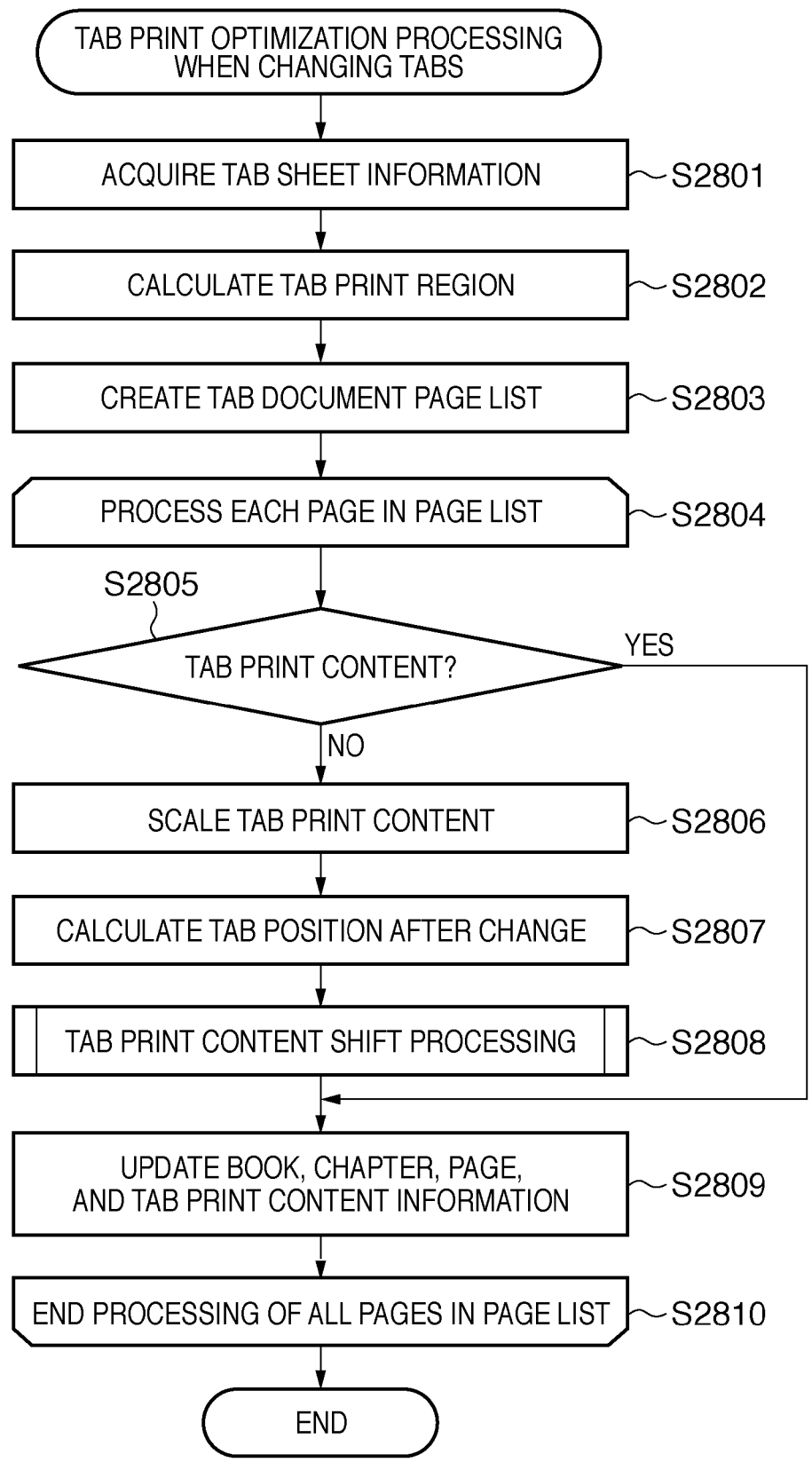
FIG. 28 is a flowchart illustrating the sequence of tab print optimization processing to be executed when the protruding tabs of tab sheets change.

FIG. 28 is a flowchart illustrating the sequence of tab print optimization processing (tab print content shift/scaling processing) to be executed when the tabs of tab sheets change. The processes will be described. Note that the tabs of tab sheets have already been changed before execution of the processing.

In step S2801, the document processing system acquires tab sheet information after the change. The types of information to be acquired are the same as in step S1401 described above. The acquisition method is also the same.

In step S2802, the document processing system calculates a tab print region. The process contents are the same as in step S1402 described above.

In step S2803, the document processing system creates the page list of tab document data. More specifically, the document processing system creates a list of tab document data to be subjected to subsequent tab print content scaling processing and shift processing.

Step S2804 indicates the start of loop processing. Step S2809 indicates the end of loop processing. The process steps from step S2805 are executed for each page of the tab document data registered in the target page list created in step S2803.

In step S2805, the document processing system determines whether the tab document data includes a tab print content. The determination is done based on the presence/absence of a tab print content of the tab print content information described above. If a tab print content exists, the process advances to step S2806. If no tab print content exists, the process advances to step S2809.

Figure 29:
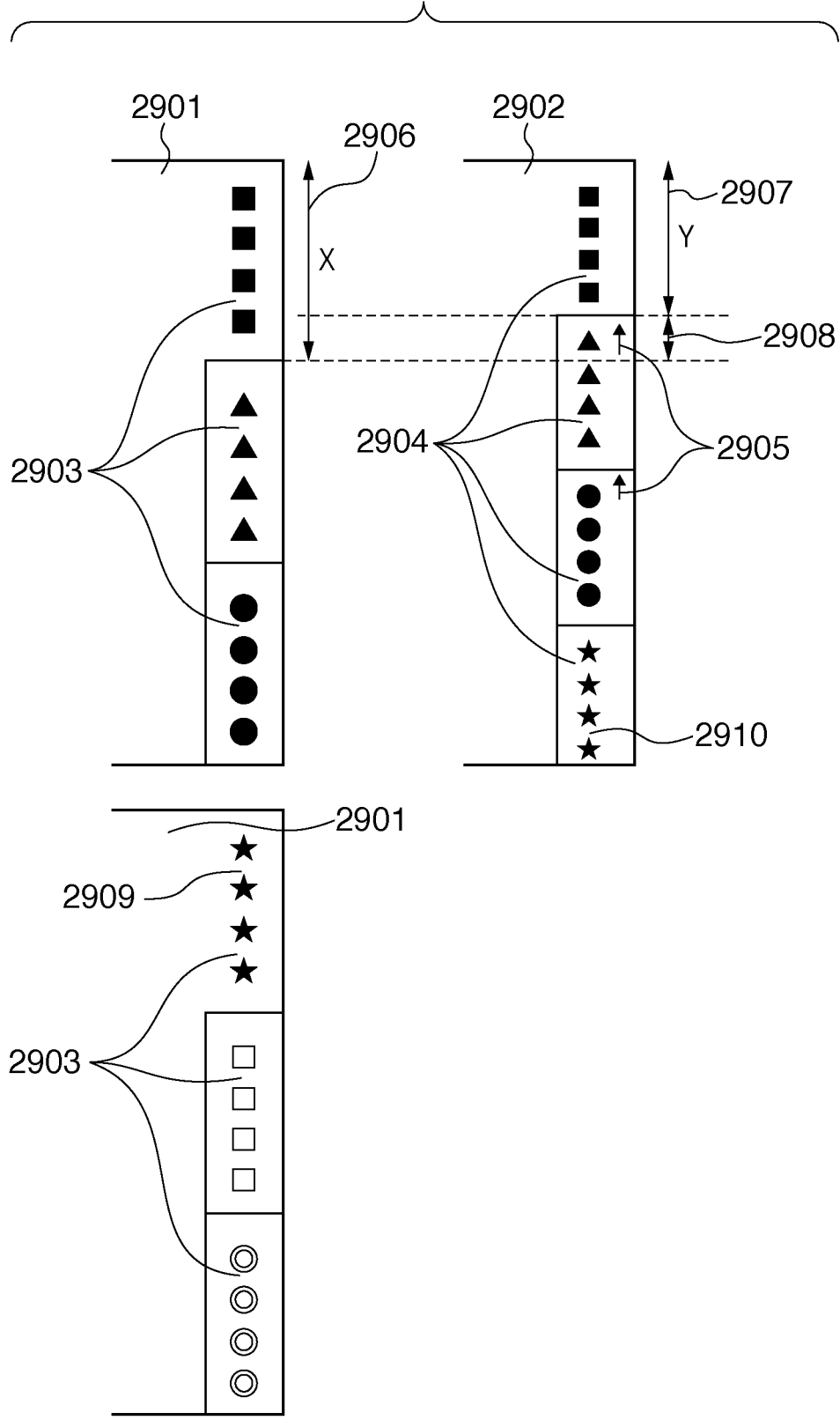
FIG. 29 is a view showing the concept of tab print content shift/scaling processing to be executed when the protruding tabs change.

In step S2806, the document processing system scales the tab print content of the tab document data in accordance with the tab sheet information after the change. FIG. 29 is a view showing the concept of tab print content shift/scaling processing to be executed when the tabs change. Reference numeral 2901 denotes a tab sheet before the change. The tab sheet before the change is a tab sheet for a 3-tab configuration. Reference numeral 2902 denotes a tab sheet after the change. The tab sheet after the change is a tab sheet for a 4-tab configuration.

In step S2806, the document processing system calculates the scaling amount of the protruding tab size of the tab sheet.

In FIG. 29, a tab height X 2906 before the change is compared with a tab height Y 2907 after the change, thereby calculating the scaling amount Y/X upon the change. In the example shown in FIG. 29, the protruding tab width does not change. If the protruding tab width changes, the scaling amount is calculated in a similar way. Based on the calculated scaling amount, the document processing system scales the tab print content. The scaling is done in accordance with the properties of the tab print content.

If the tab print content is a text object, the font size is increased/decreased. If the tab print content is an image object, the image size is increased/decreased. The size change of an image object is preferably done at a fixed aspect ratio. Hence, scaling at a fixed aspect ratio is better.

In step S2807, the document processing system calculates a tab position where the tab print content after the tab change is to be printed. Reference numeral 2904 in FIG. 29 represents a tab print content after scaling/shift. The print position of a tab print content 2909 changes to the fourth tab when the number of protruding tabs changes to four (2910).

Conversely, the tab print positions (not the actual coordinates but the tab positions in the sequence) of tab print contents 2903 do not change even after the tabs have changed.

In step S2807, the document processing system calculates the tab on which the tab print content after the tab change is to be printed.

In step S2808, the document processing system shifts the tab print content of the tab document data in accordance with the tab sheet information. The shift processing is performed by obtaining the actual shift amount (as coordinates) based on the tab position after the change calculated in step S2807 and the tab sheet information acquired in step S2801.

The contents of the tab print content shift processing are the same as in the flowchart of FIG. 21 described above. In FIG. 29, a shift amount 2908 is generated by changing the first tab. The position of each tab print content is shifted based on the tab positions of the tab sheet information after the change.

In step S2809, the document processing system updates the book, chapter, page, and tab print content information. The document processing system updates the book, chapter, and page information changed by the tab change operation and the information of the tab position and the like which are changed by the tab print content shift processing.

Step S2810 indicates the end of loop processing. When the processing up to step S2809 has ended, the document processing system repeatedly executes the process from step S2805 for the next page in the target page list.

In this embodiment, when tabs are changed, the document processing system determines whether a protruding tab position matches a tab print content position, as is apparent from the above description. Upon determining that a protruding tab position does not match a tab print content position, the document processing system shifts the position of the tab print content.

This makes it possible to automatically correct the shift between the protruding tab position and the tab print content position and reduce operation load on the user.

[Fifth Embodiment]

In the first to fourth embodiments, when it is determined that a protruding tab position does not match a tab print content position, the position of the tab print content is automatically shifted. However, the present invention is not limited to this.

For example, a user may be able to finely adjust the position of a tab print content after it has been shifted. This embodiment will be described below in detail.

Figure 30:
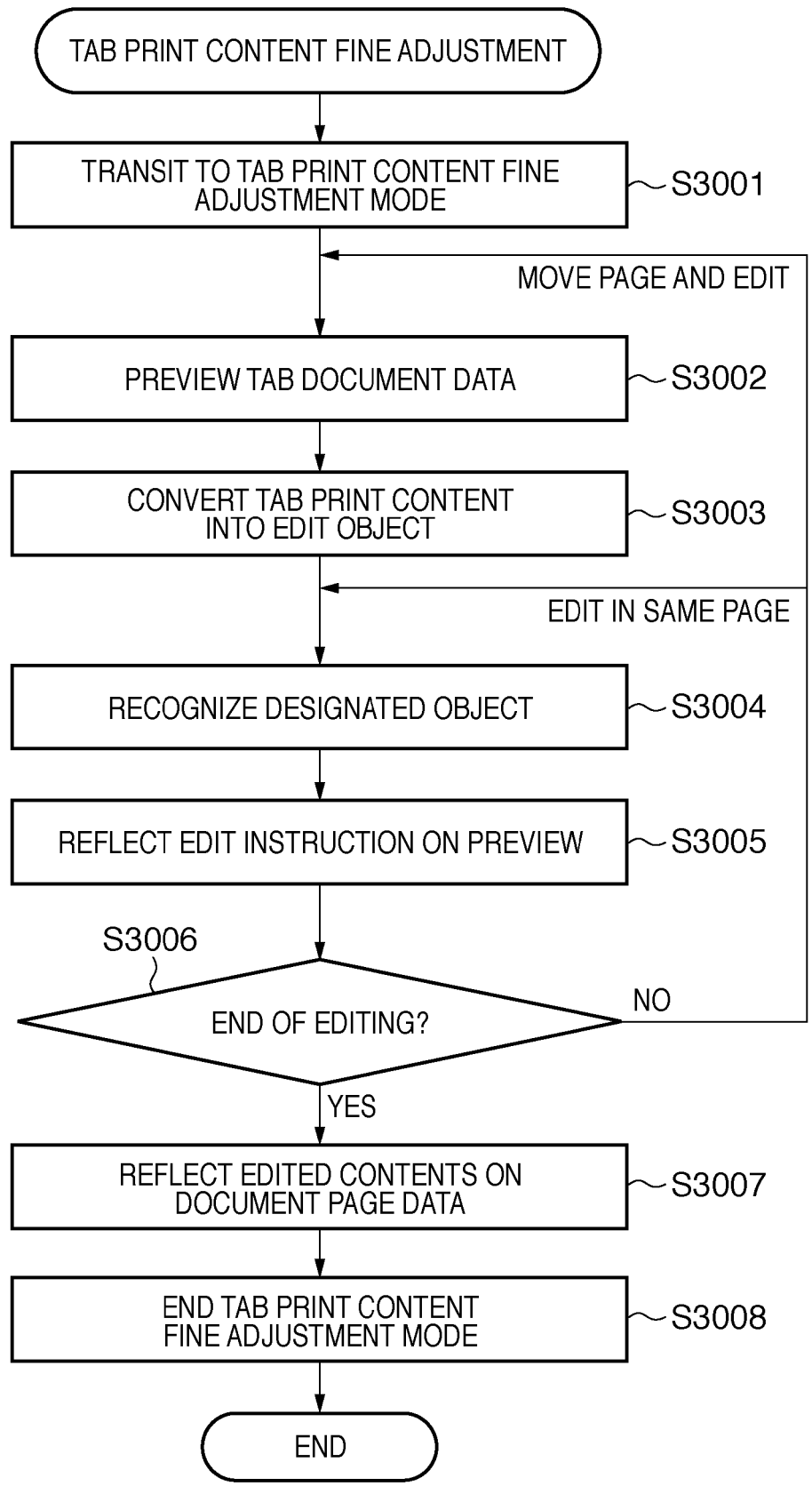
FIG. 30 is a flowchart illustrating the sequence of processing of finely adjusting a tab print content.

FIG. 30 is a flowchart illustrating the sequence of processing of finely adjusting a tab print content by a document processing apparatus according to this embodiment. The processes will be described. In step S3001, the document processing system transits to a tab print content fine adjustment mode.

The tab print content fine adjustment mode can be prepared either as a separate application program or seamlessly in the document processing system. In this embodiment, the tab print content fine adjustment mode is assumed to be prepared in the document processing system.

In step S3002, the document processing system previews tab document data.

In step S3003, the document processing system converts the tab print content into an edit object. More specifically, the document processing system converts the tab print content of the tab document data into a form easy to edit in the tab print content fine adjustment mode. An example is processing of converting a content in a text format into an object using an identifier "text object".

In step S3004, the document processing system recognizes an object designated by the user. In step S3005, the document processing system reflects contents edited by the user on the preview. In step S3006, the document processing system determines whether to end the tab print content fine adjustment mode. The determination can be done by preparing a menu such as tab print content fine adjustment mode complete and asking for a user instruction.

Without an end instruction from the user, the process returns to step S3002 or S3004 to continue the processing. To edit another tab document data, the process advances to step S3002 after page movement. The page movement can be done by preparing a menu such as tab document data page movement and asking for a user instruction. To end editing, the process advances to step S3007.

In step S3007, the document processing system reflects the edited contents on the document page. In step S3008, the document processing system ends the tab print content fine adjustment mode.

Figure 31:
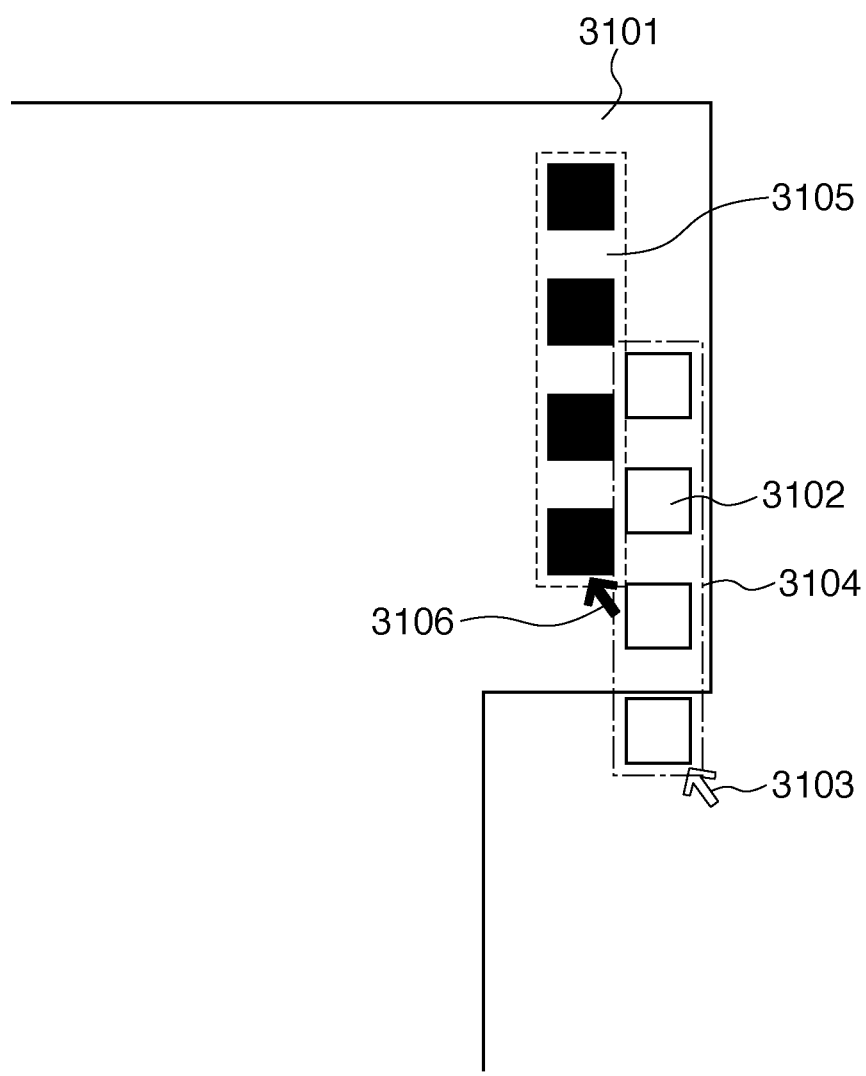
FIG. 31 is a view showing the concept of a tab print content fine adjustment mode.

FIG. 31 is a view showing the concept of the tab print content fine adjustment mode. FIG. 31 illustrates fine adjustment of a tab print content position. Tab document data 3101 is previewed in the tab print content fine adjustment mode.

Reference numeral 3102 denotes a tab print content of the tab document data; and reference numeral 3103, a mouse pointer. An edit object recognized by designating a tab print content by the mouse pointer is explicitly displayed for the user using, for example, a frame 3104. The user can adjust the position of the edit object by, for example, mouse drag.

Reference numeral 3105 denotes a moved edit object; and reference numeral 3106, a dragged mouse pointer. Movement using the mouse pointer has been exemplified. However, the present invention is not limited to this, and movement by keyboard input is also usable.

Figure 32:
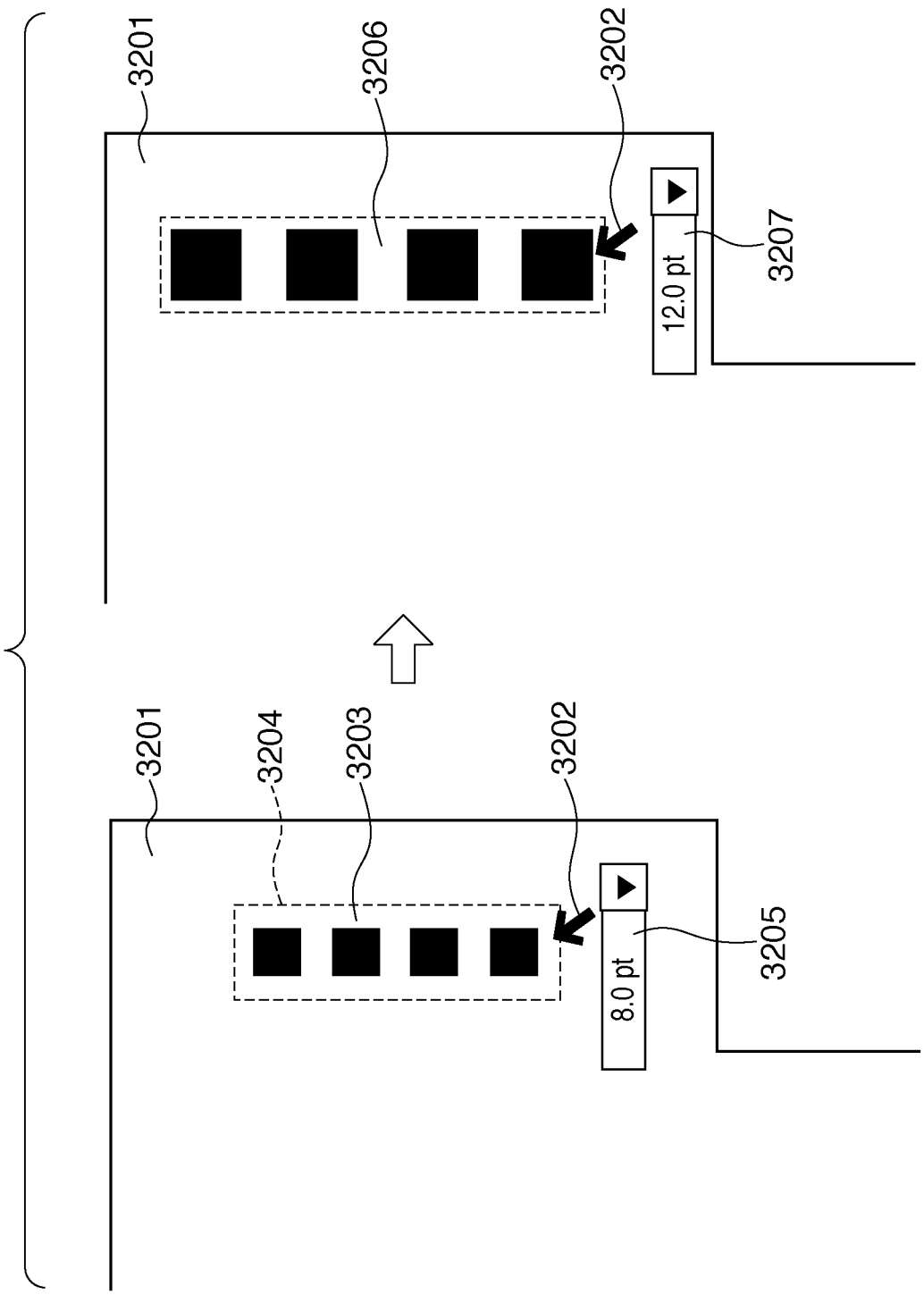
FIG. 32 is a view showing the concept of a tab print content fine adjustment mode.
Figure 33:
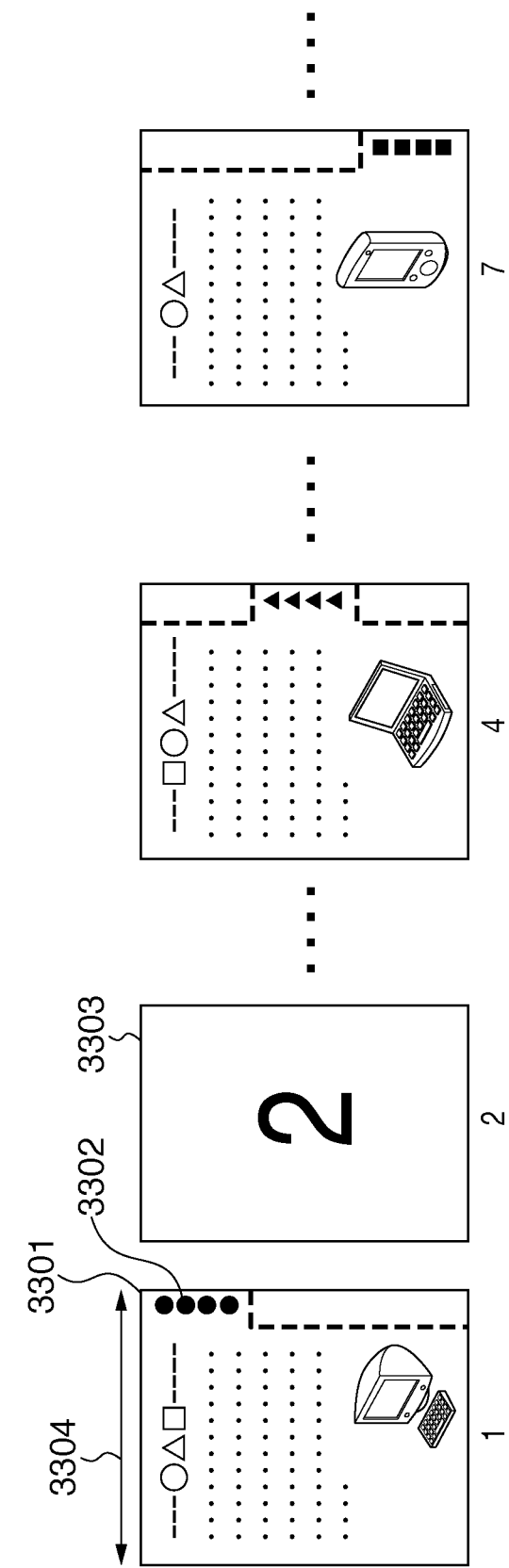
FIG. 33 is a view showing an example of an electronic document file.
Figure 34:
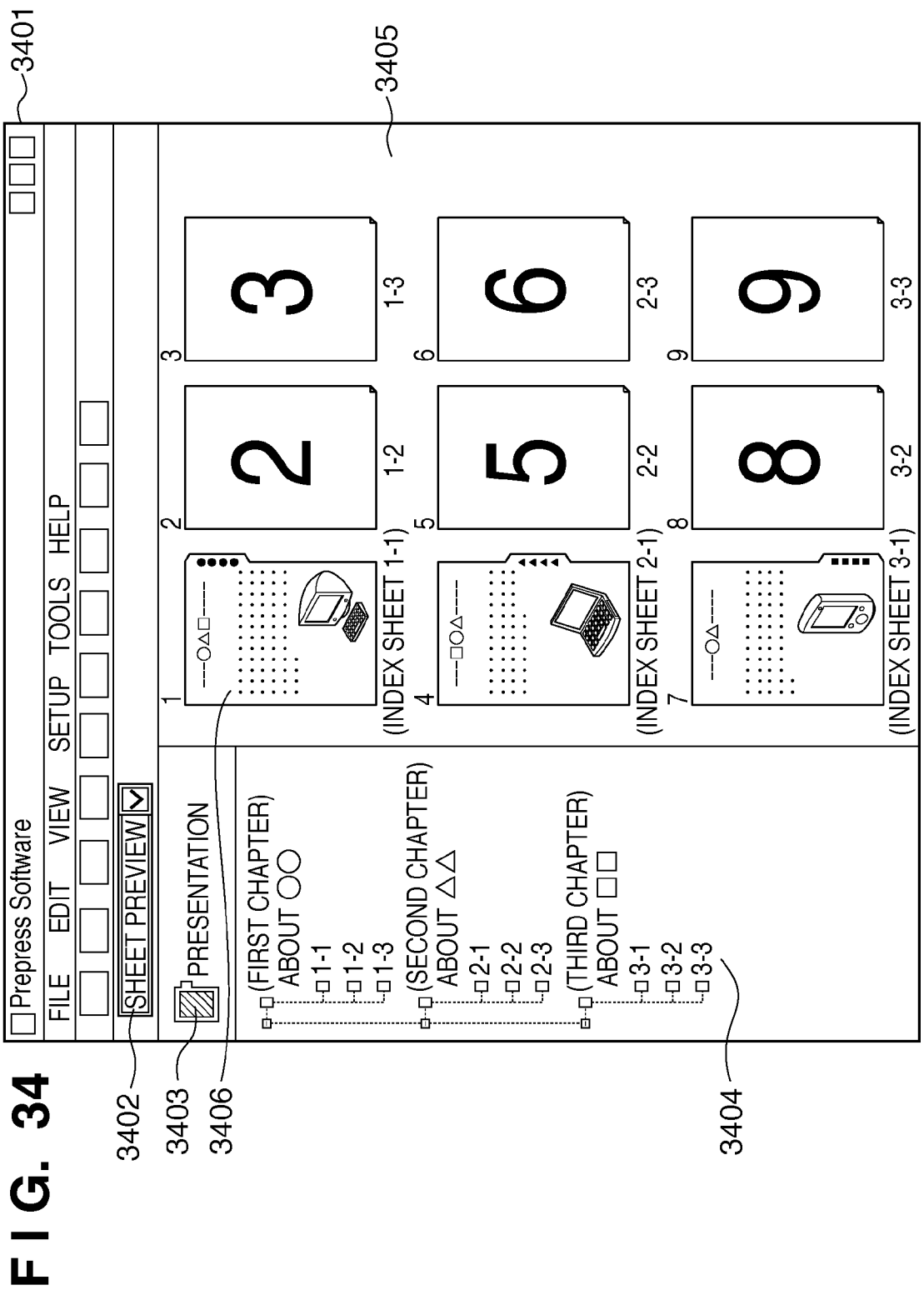
FIG. 34 is a view showing a state after the electronic document file is read out by an application program.
Figure 35:
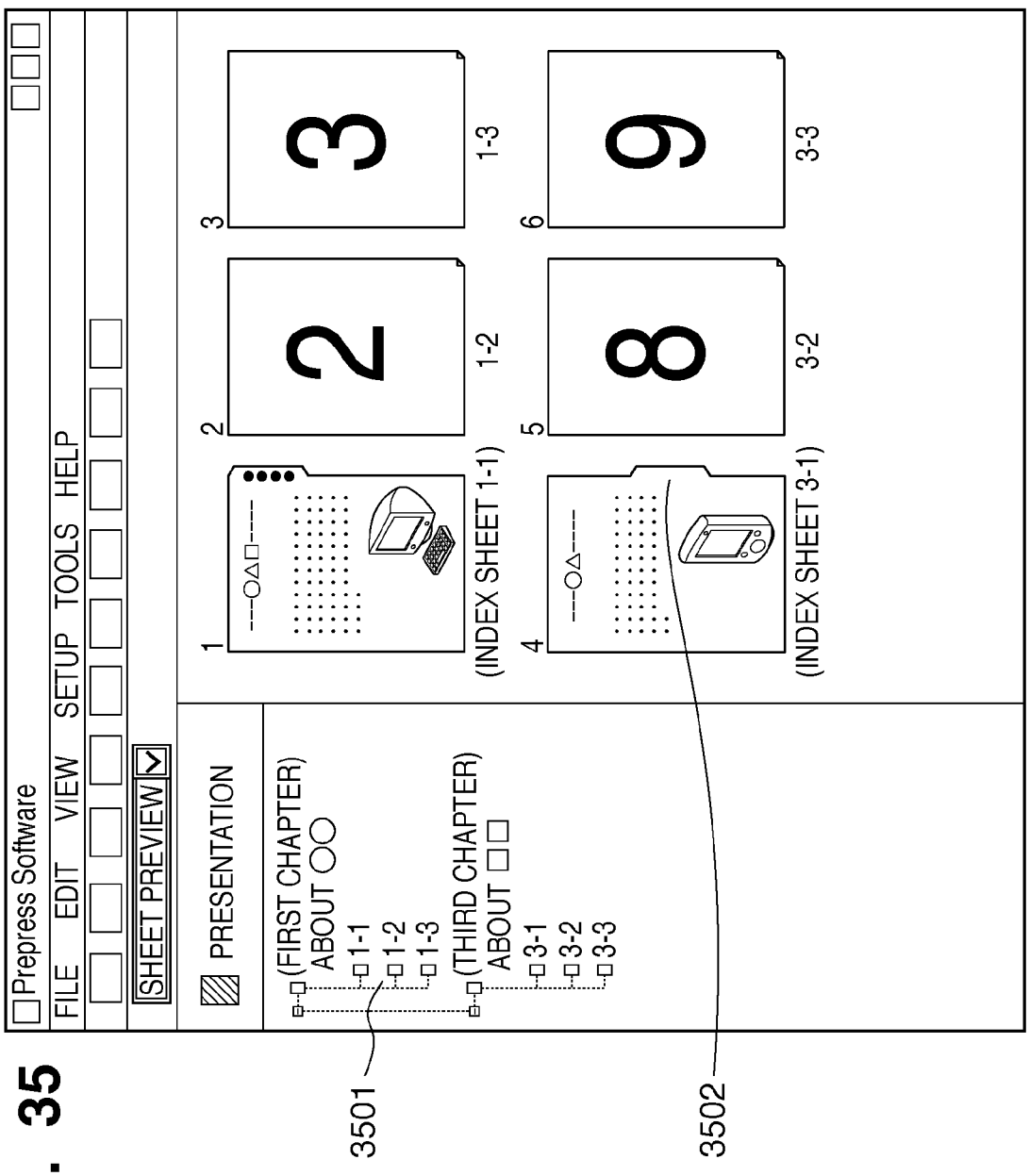
FIG. 35 is a view showing a state in which the second chapter of the book file is deleted.

FIG. 32 is a view showing the concept of the tab print content fine adjustment mode. FIG. 32 illustrates fine adjustment of the font size of a tab print content. Tab document data 3201 is previewed in the tab print content fine adjustment mode. Reference numeral 3202 denotes a mouse pointer; and reference numeral 3203, a tab print content of tab document data.

An edit object recognized by designating a tab print content by the mouse pointer is explicitly displayed for the user using, for example, a frame 3204. A font combo box 3205 displays the current font size. It is possible to change the font size by inputting a desired font size to the font combo box.

Reference numeral 3206 denotes a tab print content after the font size change; and reference numeral 3207, a font combo box after the font size change. A font size change method using a font combo box has been exemplified. However, the font size may be changed by displaying a property dialogue.

According to this embodiment, it is possible to cause the user to finely adjust the position of a tab print content after it has been shifted, as is apparent from the above description.

[Other Embodiments]

The present invention is applicable to a system including a plurality of devices (e.g., host computer, interface device, reader, and printer) or an apparatus (e.g., copying machine or facsimile apparatus) including a single device.

The object of the present invention is achieved even by supplying a computer-readable storage medium which records software program codes for implementing the functions of the above-described embodiments to the system or apparatus. In this case, the functions are implemented by causing the computer (or CPU or MPU) of the system or apparatus to read out and execute the program codes stored in the storage medium. In this case, the storage medium which stores the program codes constitutes the present invention.

Examples of the storage medium usable to supply the program codes are a Floppy® disk, hard disk, optical disk, magnetooptical disk, CD-ROM, CD-R, magnetic tape, nonvolatile memory card, and ROM.

The functions of the above-described embodiments are implemented not only when the computer executes the readout program codes but also when the OS (Operating System) running on the computer partially or wholly executes actual processing on the basis of the instructions of the program codes.

The functions of the above-described embodiments are also implemented after the program codes read out from the storage medium are written in the memory of a function expansion board inserted into the computer or a function expansion unit connected to the computer. More specifically, after the program codes are written in the memory, the CPU of the function expansion board or function expansion unit partially or wholly executes actual processing on the basis of the instructions of the program codes, thereby implementing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-119986 filed on May 1, 2008, which is hereby incorporated by reference herein in its entirety.

What is claimed is:

1. A document processing apparatus comprising:
   a memory; and
   a microprocessor connected to the memory, which stores computer instructions that cause the microprocessor to execute:
   an acquisition task that acquires tab sheet information about a tab sheet to be used for printing and tab print content information, which includes tab print data and tab position information;
   a determination task that determines, based on the tab sheet information and the tab print content information, containing the tab print data to be printed on a current protruding tab position of a current tab sheet, acquired by said acquisition task, whether the tab print data exists at another protruding tab position that is not present on the current tab sheet; and
   a shift task that, if said determination task has determined that the tab print data exists at the another tab position that is not present on the current tab sheet, shift the tab print data from the another protruding tab position that is not present on the current tab sheet to the current protruding tab position of the current tab sheet, on which the tab print data is to be printed, without changing the order or deleting any tab,
   wherein a shift amount of shifting the tab print data is derived from the current protruding tab position of the current tab sheet and the tab position of the tab print content information.

2. The apparatus according to claim 1, wherein the computer instructions stored in the memory further cause the microprocessor to execute:
   a configuration task that changes a page configuration,
   wherein said determination determines whether the tab print data for the another protruding tab position is to be shifted to the current protruding tab position of the current tab sheet when said configuration change task changes the page configuration.

3. The apparatus according to claim 2, wherein the computer instructions stored in the memory further cause the microprocessor to execute a selection task, when a page is deleted from the document data containing the tab print data, that selects whether to cause said configuration change task to change the page configuration, which is associated with the document data, or insert a dummy page in place of the deleted page.

4. A document processing method of a document processing apparatus, the method comprising:
- an acquiring step of acquiring tab sheet information about a tab sheet to be used for printing and tab print content information, which includes tab print data and tab position information;
- a determining step of determining, based on the tab sheet information and the tab print content information, containing the tab print data to be printed on a current protruding tab position of a current tab sheet, acquired in the acquiring step, whether the tab print data exists at another protruding tab position that is not present on the current tab sheet; and
- a shifting step of, if the determining step has determined that the tab print data exists at the another tab position that is not present on the current tab sheet, shifting the tab print data from the another protruding tab position that is not present on the current tab sheet to the current protruding tab position of the current tab sheet, on which the tab print data is to be printed without changing the order or deleting any tab,
- wherein a shift amount of shifting the tab print data is derived from the current protruding tab position of the current tab sheet and the tab position of the tab print content information.

5. The method according to claim 4, further comprising:
a changing step of changing a page configuration,
wherein the determining step determines whether the tab print data for the another protruding tab position is to be shifted to the current protruding tab position of the current tab sheet when the changing step changes the page configuration.

6. The method according to claim 5, further comprising a selecting step of, when a page is deleted from the document data containing the tab print data, selecting whether to cause the changing step to change the page configuration, which is associated with the document data, or insert a dummy page in place of the deleted page.

7. A non-transitory computer-readable recording medium recorded with a program executable by a computer of a document processing apparatus to execute a document processing method comprising:
- an acquiring step of acquiring tab sheet information about a tab sheet to be used for printing and tab print content information, which includes tab print data and tab position information;
- a determining step of determining, based on the tab sheet information and the tab print content information, containing the tab print data to be printed on a current protruding tab position of a current tab sheet, acquired in the acquiring step, whether the tab print data exists at another protruding tab position that is not present on the current tab sheet; and
- a shifting step of, if the determining step has determined that the tab print data exists at the another tab position that is not present on the current tab sheet, shifting the tab print data from the another protruding tab position that is not present on the current tab sheet to the current protruding tab position of the current tab sheet, on which the tab print data is to be printed without changing the order or deleting any tab,
- wherein a shift amount of shifting the tab print data is derived from the current protruding tab position of the current tab sheet and the tab position of the tab print content information.

8. The medium according to claim 7, wherein:
the document processing method further comprises a changing step of changing a page configuration, and
the determining step determines whether the tab print data for the another protruding tab position is to be shifted to the current protruding tab position of the current tab sheet when the changing step changes the page configuration.

9. The medium according to claim 8, wherein the document processing method further comprises a selecting step of, when a page is deleted from the document data containing the tab print data, selecting whether to cause the changing step to change the page configuration, which is associated with the document data, or insert a dummy page in place of the deleted page.

10. The apparatus according to claim 1, further comprising a printer that prints the tab print data on the current tab position of the current sheet after the shifting task shifts the tab print data.

11. The method according to claim 4, wherein the document processing apparatus further comprises a printer that prints the tab print data on the current tab position of the current sheet after the shifting step shifts the tab print data.

12. The medium according to claim 7, wherein the document processing apparatus further comprises a printer that prints the tab print data on the current tab position of the current sheet after the shifting step shifts the tab print data.

* * * * *